US010916136B2

(12) United States Patent
Han et al.

(10) Patent No.: US 10,916,136 B2
(45) Date of Patent: Feb. 9, 2021

(54) GEO-TAGGED VEHICLE-TO-VEHICLE COMMUNICATION SYSTEM

(71) Applicant: ALPINE ELECTRONICS, INC., Tokyo (JP)

(72) Inventors: Maung Wynn Aung Han, Walnut, CA (US); Atsushi Nakagawa, Los Angeles, CA (US)

(73) Assignee: Alpine Electronics, Inc., Tokyo (JP)

( * ) Notice: Subject to any disclaimer, the term of this patent is extended or adjusted under 35 U.S.C. 154(b) by 146 days.

(21) Appl. No.: 16/209,563

(22) Filed: Dec. 4, 2018

(65) Prior Publication Data
US 2020/0175865 A1 Jun. 4, 2020

(51) Int. Cl.
*G08G 1/0967* (2006.01)
*G08G 1/0968* (2006.01)
(Continued)

(52) U.S. Cl.
CPC ... *G08G 1/096791* (2013.01); *G06K 9/00791* (2013.01); *G08G 1/096822* (2013.01);
(Continued)

(58) Field of Classification Search
None
See application file for complete search history.

(56) References Cited

U.S. PATENT DOCUMENTS

| 9,282,446 | B2 | 3/2016 | Moshfeghi | |
| 2007/0032225 | A1* | 2/2007 | Konicek | F24F 11/30 |
| | | | | 455/417 |

(Continued)

FOREIGN PATENT DOCUMENTS

JP 2003-279366 10/2003

OTHER PUBLICATIONS

Knowles, J., "Talkbits officially launches its social voice stream apps in the UK and US," The Next Web B.V., dated Feb. 12, 2013, accessed at https://thenextweb.com/apps/2013/02/12/talkbits-officially-launches-its-social-voice-stream-apps-in-the-uk-and-us/, in 4 pages.
(Continued)

*Primary Examiner* — Tamara L Weber
(74) *Attorney, Agent, or Firm* — Knobbe, Martens, Olson & Bear LLP

(57) ABSTRACT

Systems and methods for providing geo-tagged vehicle-to-vehicle communication to a follower vehicle during off-road caravanning. In some embodiments, verbal instructions spoken by a leader driver are captured by the vehicle-to-vehicle communication system, tagged with geospatial location information, and broadcast to follower vehicles. Follower vehicles can receive the broadcast verbal instructions, and the system can cause the verbal instructions to be reproduced when the follower vehicle is determined to be within a threshold distance of the geospatial location where the leader driver gave the verbal instructions. The verbal instructions can be accompanied by visual data, such as images and videos. The system can add navigation and landmark markers in the visual data to enhance a leader driver's geo-tagged instructions. A message path can formed from several verbal instructions spoken by the leader driver.

20 Claims, 16 Drawing Sheets

(51) Int. Cl.
*G06K 9/00* (2006.01)
*H04W 4/46* (2018.01)
*H04W 4/021* (2018.01)
*H04B 1/3827* (2015.01)

(52) U.S. Cl.
CPC ....... *G08G 1/096872* (2013.01); *H04B 1/385* (2013.01); *H04W 4/021* (2013.01); *H04W 4/46* (2018.02); *H04B 2001/3866* (2013.01)

(56) References Cited

U.S. PATENT DOCUMENTS

| | | | |
|---|---|---|---|
| 2007/0276596 A1* | 11/2007 | Solomon | G08G 1/096861 701/431 |
| 2011/0306328 A1 | 12/2011 | Yonker et al. | |
| 2016/0302046 A1* | 10/2016 | Velusamy | G08G 1/164 |
| 2018/0144762 A1* | 5/2018 | Guerrieri | G06F 3/16 |
| 2018/0216956 A1* | 8/2018 | Ritcherson | H04W 4/021 |
| 2019/0387378 A1* | 12/2019 | Willis | H04L 67/12 |

OTHER PUBLICATIONS

Lomas, N., "Location-Based Voice-Messaging App Startup Talkbits Raises $2 Million from Early Stage VC Firm Runa Capital," Oath Tech Network, dated Oct. 17, 2012, accessed at https://techcrunch.com/2012/10/17/location-based-voice-messaging-app-startup-talkbits-raises-2-million-from-early-stage-vc-firm-runa-capital/, in 5 pages.

\* cited by examiner

GEO-TAGGED VEHICLE-TO-VEHICLE COMMUNICATION SYSTEM

TECHNICAL FIELD

This disclosure relates to geo-tagged vehicle-to-vehicle communication systems and methods for providing instruction guidance to a follower vehicle during off-road caravanning.

BACKGROUND

Off-road driving is the activity of driving or riding a vehicle on unsurfaced roads or tracks, made of materials such as sand, gravel, riverbeds, mud, snow, rocks, and other natural terrain. Types of off-roading vary in intensity from leisure drives undertaken by hobbyists and enthusiasts to competitive drives undertaken by professionals. Some vehicles are specifically built to support off-road driving and can navigate on terrain that is challenging or impassable for on-road vehicles. There are communities of off-road drivers who share the thrill of off-road driving, and drivers will often go off-road driving in a group. One off-road vehicle, the leader vehicle, will first navigate through a given terrain and will be followed by one or more off-road vehicles, follower vehicles. Given the off-road nature of the activity, follower vehicles sometimes need to drive a significant distance behind a leader vehicle to avoid dust, rocks, or other materials thrown up by the leader vehicle's tires. Some off-road driving groups use short-range radios so that the leader driver can broadcast to follower drivers a description of where to take a given turn, warn of a danger, or provide specific instructions on how to navigate a specific obstacle.

A follower driver can forget a leader driver's instructions between the time the instructions are given and when the follower driver reaches the location where the leader driver broadcast the instructions. A follower driver can not recognize the exact location that pertains to a leader driver's instructions. As a result, a follower driver can deviate from the leader vehicle's path or be unable to recognize a hazardous condition. A deviation from the leader vehicle's path or misrecognition of a hazardous condition can have dangerous consequences given the rough terrain that accompanies off-road driving. These dangerous consequence can be injury to a follower driver or damage to a follower driver's equipment.

SUMMARY

Systems and methods are disclosed related to providing off-road vehicle-to-vehicle communication. In some embodiments, a vehicle-to-vehicle communication system captures a leader driver's instructions, tags the instructions with GPS coordinates, and broadcasts it to follower vehicles. The system determines the distance between a follower vehicle's real-time location and the GPS coordinates of the leader driver's instructions. Based in part on the determined distance, the system determines whether the leader driver's instructions should be reproduced to the follower driver. The system can determine that the follower vehicle has deviated too far from the leader driver's message path, provide a warning to the follower driver, and route the follower driver to a selected point on the leader vehicle's message path. In some embodiments, the leader driver's instructions include images or video data which can include navigational or landmark markers.

One general aspect includes a system for facilitating communications between a leader driver of a leader off-road vehicle and a follower driver of a follower off-road vehicle. The system can include a wireless data interface configured to receive a maneuver instructions payload. The maneuver instructions payload can include electronically encoded verbal instructions where the verbal instructions include instructions spoken by the leader driver at a primary maneuver location. The maneuver instructions can include electronically encoded primary maneuver location coordinates that correspond to a GPS location at which the leader driver began the verbal instructions. The system can include a location data interface configured to receive a real-time vehicle location of the follower vehicle from a satellite-linked position receiver. The system can include a hardware processor connected to a memory system. The memory system can include instructions executable by the hardware processor, where the instructions executed by the hardware processor can be configured to determine that the real-time vehicle location of the follower vehicle is within a threshold distance of the primary maneuver location, and in response to determining that the real-time vehicle location of the follower vehicle is within the threshold distance of the primary maneuver location, reproduce the verbal instructions to the follower driver.

Implementations may include one or more of the following features. The maneuver instructions payload can include electronically encoded secondary maneuver location coordinates that correspond to a secondary maneuver location, where the secondary maneuver location correlates to a GPS location where the leader driver continued giving verbal instructions. The maneuver instructions payload can include a message path that has the primary maneuver location, the secondary maneuver location, and a path connecting the primary maneuver location to the secondary maneuver location.

The instructions, when executed by the hardware processor, can be configured to cause the system to determine when the real-time vehicle location of the follower vehicle is within a second threshold distance of the secondary maneuver location. In response to determining that the real-time location of the follower vehicle is within the second threshold distance of the secondary maneuver location, the instructions executed by the hardware processor cause the system to continue reproducing the verbal instructions. In determining that the real-time location of the follower vehicle is not within the second threshold distance of the secondary maneuver location, the instructions executed by the hardware processor can cause the system to pause the reproduction of the verbal instructions and prompt the follower driver to indicate if the reproduction of the verbal instructions should be continued. In response to the follower driver indicating that the reproduction of the verbal instructions should be continued, the instructions executed by the hardware processor cause the system to continue reproducing the verbal instructions.

The instructions, when executed by the hardware processor, can be configured to cause the system to determine that the real-time vehicle location of the follower vehicle has deviated from the message path by at least a third threshold distance. In response to determining that the real-time vehicle location of the follower vehicle has deviated from the message path by at least the third threshold distance, the instructions executed by the hardware processor cause the system to generate a path deviation alert perceivable by the follower driver.

The instructions, when executed by the hardware processor, can be configured to cause the system to, in response to determining that the real-time vehicle location of the follower vehicle has deviated from the message path, pause the reproduction of the verbal instructions and prompt the follower driver to indicate if the reproduction of the verbal instructions should be continued. In response to the follower driver indicating that the reproduction of the verbal instructions should be continued, the instructions executed by the hardware processor cause the system to continue reproducing the verbal instructions.

The instructions, when executed by the hardware processor, can be configured to cause the system to, in response to determining that the real-time vehicle location of the follower vehicle has deviated from the message path, prompt the follower driver to indicate if the follower driver should be routed back to the message path. In response to the follower driver indicating that the follower driver should be routed back to the message path, the instructions executed by the hardware processor can cause the system to generate a display of the message path and the real-time location of the follower vehicle, and prompt the follower driver to select a location along the message path. In response to the follower driver selecting a location along the message path, the instructions executed by the hardware processor can cause the system to generate direction guidance routing the follower driver to the selected location along the message path.

Implementations may include a camera interface configured to receive images captured by a camera positioned to capture imagery in the vicinity of the leader vehicle. The maneuver instructions can include electronically encoded imagery captured by the camera at the primary maneuver location. The instructions, when executed by the hardware processor, can be configured to cause the system to reproduce at least a portion of the imagery in a manner perceivable by the follower driver in response to determining that the real-time location of the follower vehicle is within the threshold distance of the primary maneuver location. The maneuver instructions payload can include electronically encoded secondary imagery captured by the camera at the secondary maneuver location. The instructions, when executed by the hardware processor, can be configured to cause the system to reproduce at least a portion of the secondary imagery in a manner perceivable by the follower driver in response to determining that the real-time location of the follower vehicle is within the threshold distance of the secondary maneuver location.

The instructions, when executed by the hardware processor, can be configured to cause the system to determine that the verbal instructions comprise a navigation keyword. In response to determining that the verbal instructions include a navigation keyword, the instructions executed by the hardware processor can cause the system to receive a keyword geospatial location from the satellite-linked position receiver and generate a display of a navigation marker on a map at the keyword geospatial location. The instructions, when executed by the hardware processor, can be configured to cause the system to determine that the verbal instructions comprise a landmark keyword. In response to determining that the verbal instructions include a landmark keyword, the instructions executed by the hardware processor can cause the system to use an image recognition algorithm to identify a landmark in the imagery and generate a display of a landmark marker in the imagery.

The maneuver instructions payload can include electronically encoded video captured by the camera at the primary maneuver location. The instructions, when executed by the hardware processor, can be configured to cause the system to reproduce the video in a manner perceivable by the follower driver in response to determining that the real-time vehicle location of the follower vehicle is within the threshold distance of the primary maneuver location. The instructions executed by the hardware processor can cause the system to determine that the verbal instructions comprise a navigation keyword and/or a landmark keyword. In response to determining that the verbal instructions comprise a navigation keyword, the instructions executed by the hardware processor can cause the system to generate a display of a navigation marker superimposed on the video. In response to determining that the verbal instructions comprise the landmark keyword, the instructions executed by the hardware processor can use an image recognition algorithm to identify a landmark in the video and generate a display of a landmark marker in the video.

Implementations may include that the system can be configured to begin recording the verbal instructions when the leader driver speaks a trigger word. The instructions, when executed by the hardware processor, can be configured to cause the system to determine that the leader driver has spoken a recipient keyword identifying a recipient of the verbal instructions. In response to determining that the leader driver has spoken the recipient keyword, the instructions executed by the hardware processor can be configured to identify at least one corresponding intended recipient and reproduce the verbal instructions in a manner perceivable by the at least one corresponding intended recipient.

Implementations may include that the system can be configured to begin recording the verbal instructions when the leader driver speaks at or above a threshold volume. The system can be configured to begin recording the verbal instructions when the leader driver presses a button. The maneuver instructions payload can include sensor information collected by a sensing system connected to the first off-road vehicle.

One general aspect includes a system for facilitating communications between a leader driver of a leader vehicle and a follower driver of a follower vehicle. The system can include a wireless data interface configured to receive a maneuver instructions payload. The maneuver instructions payload can include electronically encoded maneuver instructions where the maneuver instructions include instructions from the leader driver at a primary maneuver location. The maneuver instructions can include electronically encoded primary maneuver location coordinates that correspond to a GPS location at which the leader driver began providing the maneuver instructions. The system can include a location data interface configured to receive a real-time vehicle location of the follower vehicle from a satellite-linked position receiver. The system can include a hardware processor connected to a memory system. The memory system can include instructions executable by the hardware processor, where the instructions executed by the hardware processor can be configured to cause the system to determine that the real-time vehicle location of the follower vehicle is within a threshold distance of the primary maneuver location, and in response to determining that the real-time vehicle location of the follower vehicle is within the threshold distance of the primary maneuver location, reproduce the maneuver instructions to the follower driver.

One general aspect includes headgear configured to be worn by a driver of a vehicle and to facilitate communication between drivers of off-road vehicles. The headgear can include a vehicle-to-vehicle communication system, a speaker, a microphone, a data interface configured to connect to the hardware processor, and a power connection configured to connect to a power supply.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

DETAILED DESCRIPTION OF EMBODIMENTS

This disclosure presents various embodiments of systems and methods related to providing vehicle-to-vehicle communication between a leader driver of a leader off-road vehicle and a follower driver of a follower off-road vehicle. The disclosure presents various embodiments of systems and methods related to providing a follower driver with the leader driver's maneuver instructions to safely and reliably follow the leader vehicle and navigate through difficult terrain.

Providing the leader driver's instructions to follower vehicles can be challenging because there is a time delay between when a leader driver provides maneuver instructions and when a follower vehicle reaches the location where those instructions are relevant. Some embodiments provide location-tagged instructions that are reproduced to be perceived by a follower driver when the follower vehicle is in close proximity to the location at which the leader vehicle was located when the first driver began the maneuver instructions. This relieves a follower driver from needing to remember the leader driver's instructions until the follower vehicle reaches the location where the leader driver began the maneuver instructions. This relieves a follower driver from having to determine the location that corresponds to the leader driver's maneuver instructions.

Some embodiments provide visual data, such as images or videos, as part of the location-tagged instructions, and in some embodiments, navigation and/or landmark markers can be added to the visual data. This depicts what the leader driver was perceiving when providing the maneuver instructions and can resolve ambiguities that may exist in any verbal maneuver instructions provided by the leader driver to a follower vehicle.

Some embodiments provide headgear that includes a vehicle-to-vehicle communication system. Given headgear's compact nature, this could better accommodate certain smaller subclasses of off-road vehicles, such as dirt bikes or four wheelers, but the use of headgear is in no way limited to smaller subclasses of off-road vehicles.

Example of Location-Tagged Vehicle-to-Vehicle Communication

Figure 1:
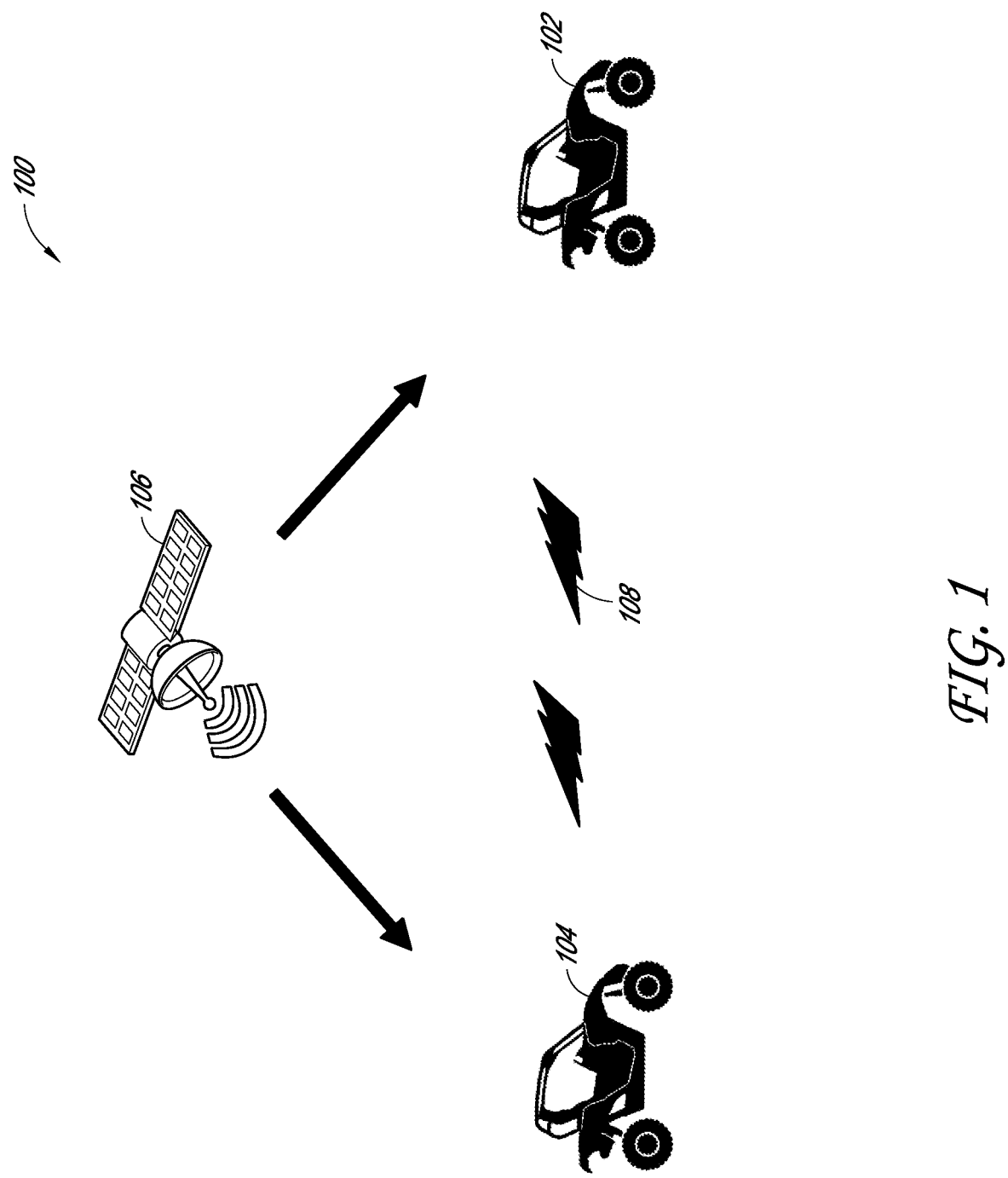
FIG. 1 illustrates an example of location-tagged vehicle-to-vehicle communication.

FIG. 1 is a drawing depicting an example embodiment of location-tagged vehicle-to-vehicle communication 100, according to some embodiments. The drawing is provided for the purpose of facilitating description of aspects of some embodiments. The drawing does not attempt to illustrate all aspects of the disclosure and should not be considered limiting.

FIG. 1 illustrates an example of location-tagged vehicle-to-vehicle communication 100. A leader vehicle 102—also referred to as a leader off-road vehicle, first vehicle, or first off-road vehicle—leads a follower vehicle 104—also referred to as a follower off-road vehicle, second vehicle, or second off-road vehicle. The leader driver provides instructions to the follower vehicle 104 which are recorded and tagged with GPS coordinates received from a satellite 106. The leader driver's location-tagged instructions 108 are broadcast to the follower vehicle 104. The follower vehicle 104 stores the location tagged instructions. The satellite 106 supplies the follower vehicle 104 with the real-time GPS coordinates of the follower vehicle 104. When the real-time GPS coordinates of the follower vehicle 104 are in close proximity to the GPS coordinates of the location-tagged instructions 108, the location-tagged instructions are reproduced in a manner perceivable by the follower driver.

As discussed, FIG. 1 illustrates an example embodiment of a location-tagged vehicle-to-vehicle communication. Other embodiments can include one or more other criteria described with reference to FIG. 1. Embodiments that may omit or add to one or more features to the example location-tagged vehicle-to-vehicle communication of FIG. 1 are within the scope of this disclosure.

Example System Diagram

Figure 2A:
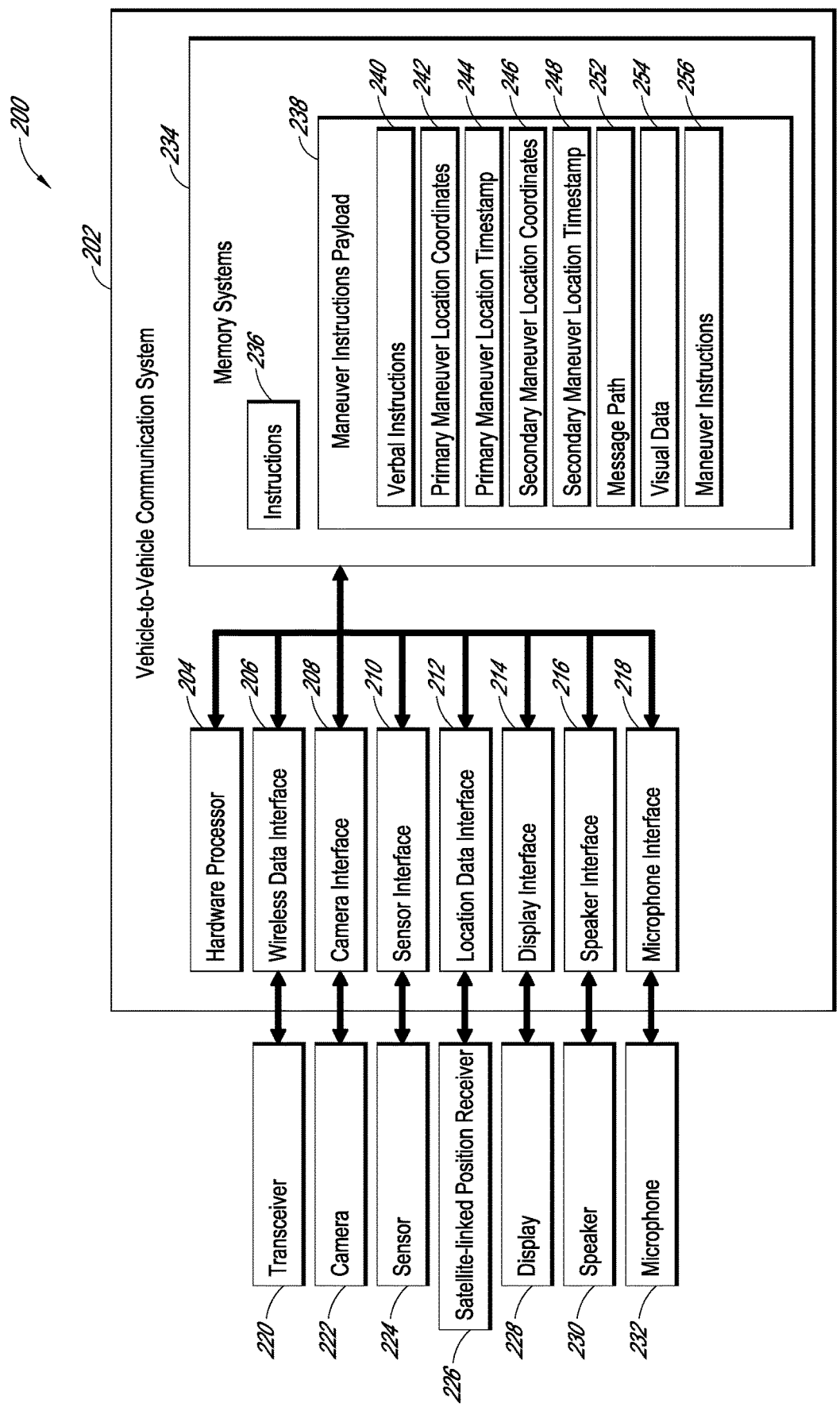
FIG. 2A is a system diagram of an example vehicle-to-vehicle communication system.

FIG. 2A is an example system diagram of a vehicle guidance system, according to some embodiments. As depicted in FIG. 2A, the vehicle guidance system 200 can include a vehicle-to-vehicle communication system 202. The architecture of the vehicle-to-vehicle communication system 202 can include an arrangement of computer hardware and software components used to implement aspects of the present disclosure. The vehicle-to-vehicle communication system 202 may include more or fewer elements than those shown in FIG. 2A. It is not necessary, however, that all of these elements be shown in order to provide an enabling disclosure. In some embodiments, the vehicle-to-vehicle communication system 202 is an example of what is referred to hereinbefore as a vehicle guidance system.

As illustrated, the vehicle-to-vehicle communication system 202 can include a hardware processor 204, wireless data interface 206, camera interface 208, sensor interface 210, location data interface 212, display interface 214, speaker interface 216, microphone interface 218, and/or memory system 234, all of which can communicate with one another by way of a data communication technique. The hardware processor 204 can read and write to the memory system 234 and can execute computer program instructions 236 stored on the memory system 236 to perform the methods disclosed herein.

The wireless data interface 206 can input/output from a transceiver 220 that can be used to communicate between vehicles. The transceiver 220 can send and receive information contained in the maneuver instructions payload 238—including the verbal instructions 240, primary maneuver location coordinates 242, primary maneuver location timestamp 244, secondary maneuver location coordinates 246, secondary maneuver location timestamp 248, message path 252, visual data 254, and maneuver instructions 256—and/or other information. The transceiver 220 can send and receive the real-time location of a vehicle as provided by the location data interface 212. The transceiver 220 and wireless data interface 206 can be controlled by the hardware processor 204 executing the computer program instructions 236 stored on the memory system 236.

The camera interface 208 can receive input from a camera 222 that can be used to capture visual data 254. Visual data 254 includes, but is not limited to, images and videos. The camera 222 can be used to determine the distance between a vehicle and an object. The camera 222 and camera interface 208 can be controlled by the hardware processor 204 executing the computer program instructions 236 stored on the memory system 236.

The sensor interface 210 can accept input from a sensor 224. Sensor 224 can be an optic sensor, radar sensor, infrared sensor, laser sensor, LiDAR sensor, accelerometer, gyroscope, altimeter, and/or other sensing system. In some embodiments, the sensor 224 can be used to determine the distance between a vehicle and an object. For example, sensor 224 can be used to determine the distance between a vehicle and a landmark 1414 of FIG. 14. In some embodiments, sensor 224 can be used to determine vehicle elevation. In some embodiments, sensor 224 can be used to determine the slope of terrain. The sensor 224 can be used to supplement the verbal instructions 240, visual data 254, and/or maneuver instructions 256. The sensor 224 and sensor interface 210 can be controlled by the hardware processor 204 executing the computer program instructions 236 stored on the memory system 236.

The location data interface 212 can receive input from the satellite-linked position receiver 226. The location data interface 212 can connect to a map data server or weather data server via one or more networks (such as the internet, 3G/Wi-Fi/LTE/5G networks, etc.). The location data interface 212 can receive geopositioning information from the satellite-linked position receiver 226. In some embodiments, the location data interface 212 can receive geopositioning information from a network (such as the internet, 3G/Wi-Fi/LTE/5G networks, etc.). In some embodiments, the location data interface 212 may receive, where applicable, alternate position information or information that can be used for location determination (such as cellular and/or Wi-Fi signal that can be used to triangulate a location) and determine the location of a vehicle. The satellite-linked position receiver 226 can communicate with satellites, such as satellite 106 of FIG. 1. The location data interface 212 and satellite-linked position receiver 226 can be controlled by the hardware processor 204 executing the computer program instructions 236 stored on the memory system 236.

The display interface 214 can receive input from the display 228. The display 228 can display the information contained in the maneuver instructions payload 238—including the verbal instructions 240, primary maneuver location coordinates 242, primary maneuver location timestamp 244, secondary maneuver location coordinates 246, secondary maneuver location timestamp 248, message path 252, visual data 254, and maneuver instructions 256—and other information. In some embodiments, the real-time location of a vehicle can be displayed. In some embodiments, the display 228 can display a map provided by the location data interface 212. The display 228 can display a map stored in the memory system 234. The display interface 214 and display 228 can be controlled by the hardware processor 204 executing the computer program instructions 236 stored on the memory system 236.

The speaker interface 216 can output information through the speaker 230. The outputted information can include verbal instructions 240, the warning 910 of FIG. 9A and FIG. 9B, the routing instructions 924 of FIG. 9B, real-time communication between two vehicles, and/or other audio. The speaker interface 216 and speaker 230 can be controlled by the hardware processor 204 executing the computer program instructions 236 stored on the memory system 236.

The microphone interface 218 can receive input information through microphone 232. The input information can include any audio, including the verbal instructions 240 of the leader driver. The microphone interface 218 and microphone 232 can be controlled by the hardware processor 204 executing the computer program instructions 236 stored on the memory system 236.

The memory 234 can contain computer program instructions 236 that the hardware processor 204 can execute in order to implement one or more embodiments described herein. The memory 234 can generally include RAM, ROM and/or other persistent, auxiliary or non-transitory computer-readable media. The memory 234 can store an operating system that provides computer program instructions for use by the hardware processor 204 in the general administration and operation of the vehicle-to-vehicle communication system 202.

The memory system 234 can include a maneuver instructions payload 238. The maneuver instructions payload 238 can include the verbal instructions 240, primary maneuver location coordinates 242, primary maneuver location timestamp 244, secondary maneuver location coordinates 246, secondary maneuver location timestamp 248, message path 252, visual data 254, maneuver instructions 256, and other information.

The verbal instructions 240 can be the instructions spoken by a leader driver that are for a follower driver. In some embodiments, the verbal instructions 240 can be the instructions spoken by a passenger in the leader vehicle. In some embodiments, the verbal instructions 240 can be supplemented or overridden by a follower driver or passenger of a follower vehicle.

The primary maneuver location coordinates 242 can be the GPS coordinates or geospatial location of the leader vehicle when the leader driver began the verbal instructions 240. In other embodiments, the primary maneuver location coordinates 242 can be the GPS or geospatial location of the leader vehicle when the leader driver began providing maneuver instructions 256. Maneuver instructions 256 are any instructions, regardless of form, given by a leader driver or passenger in a leader vehicle to a follower vehicle. The primary maneuver location timestamp 244 is a timestamp of the time when the leader vehicle was at the primary maneuver location coordinates 242.

The secondary maneuver location coordinates 246 can be the GPS coordinates or geospatial location of the leader vehicle when the leader driver continued giving verbal instructions 240. The secondary maneuver location timestamp 248 is a timestamp at the time the leader vehicle was at the secondary maneuver location coordinates.

Figure 5:
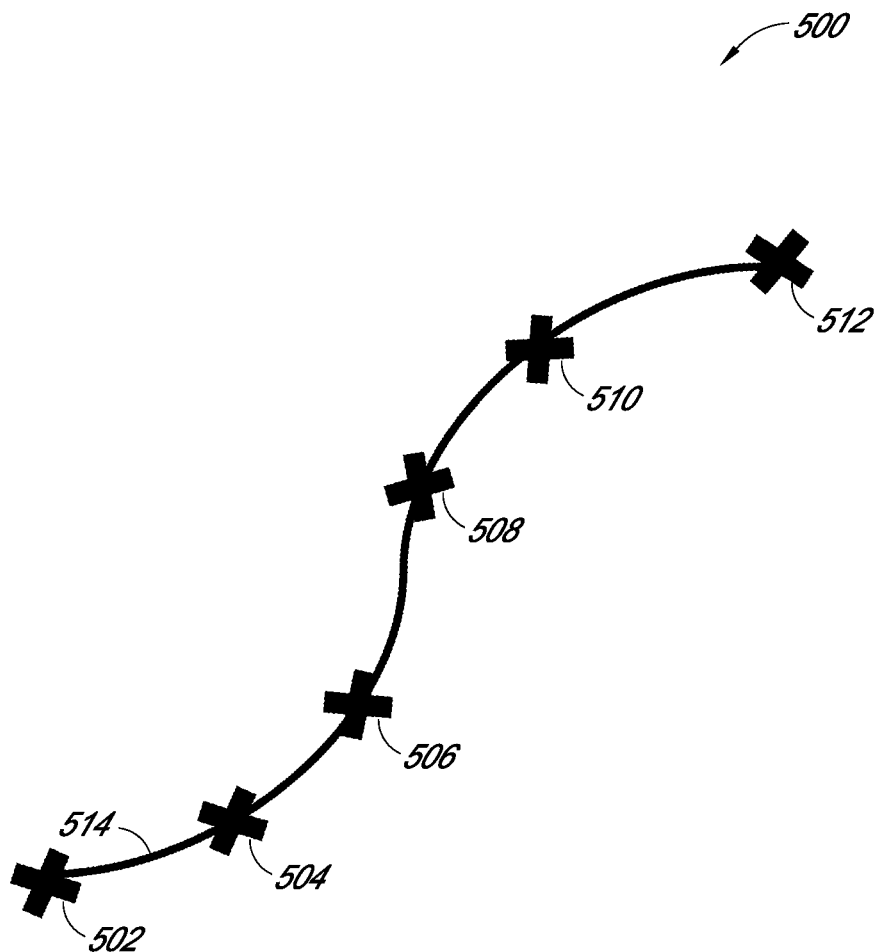
FIG. 5 illustrates an example of a message path.

The message path 252 can include primary maneuver location coordinates 242, secondary maneuver location coordinates 246, and/or a path 514 of FIG. 5. The visual data 254 can include images and/or video.

In some embodiments, the vehicle-to-vehicle communication system 202 is installed in a vehicle and/or integrated with an on-board navigation system. In some embodiments, the system 202 can be a software application configured to execute on a general-purpose or special-purpose computing device, such as, for example, a smartphone, a tablet computer, a mobile GPS device, or a laptop computer.

Example Headgear Connected to Vehicle-to-Vehicle Communication System

Figure 2B:
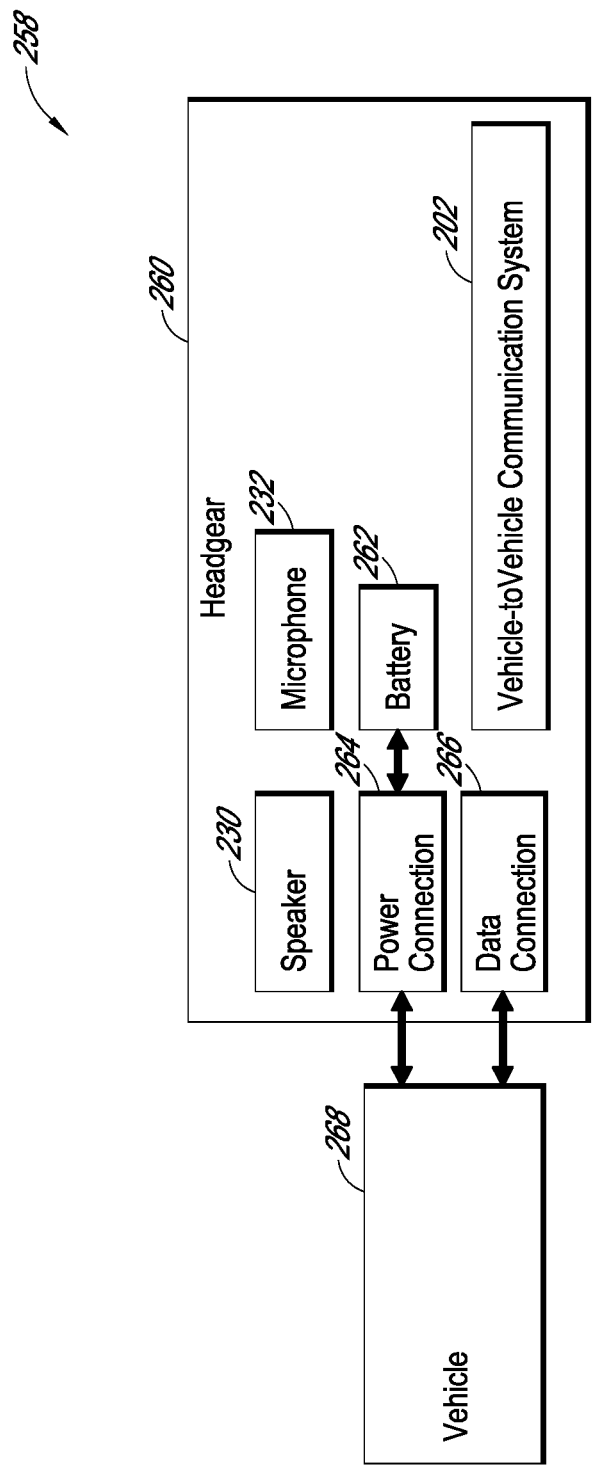
FIG. 2B is a system diagram of example headgear comprising a vehicle-to-vehicle communication system.

FIG. 2B is an example system diagram of a headgear vehicle guidance system, according to some embodiments. As depicted in FIG. 2B, the headgear vehicle guidance system 258 can include a headgear system 260. The architecture of the headgear system 260 can include an arrangement of computer hardware and software components used to implement aspects of the present disclosure. The headgear system 260 may include more or fewer elements than those shown in FIG. 2B. It is not necessary, however, that all of these elements be shown in order to provide an enabling disclosure. In some embodiments, the headgear system 260 is an example of what is referred to hereinbefore as a headgear vehicle guidance system.

As illustrated, the headgear system 260 includes the vehicle-to-vehicle communication system 202 of FIG. 2A. The headgear system 260 can include a speaker 230 and microphone 232 within the headgear system 260. The headgear system 260 can include a power connection that is configured to connect to a vehicle 268 and/or a battery 262. The headgear system 260 can include a data connection 266 configured to connect to the vehicle 268.

Figure 3:
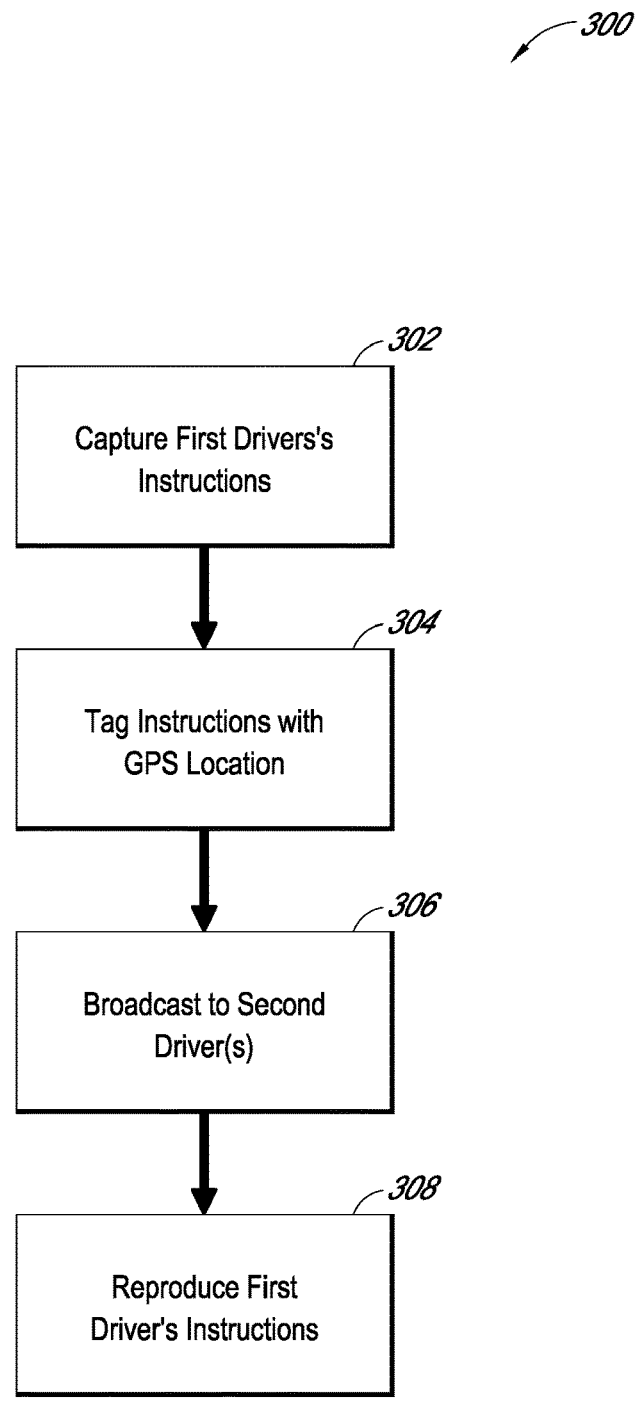
FIG. 3 illustrates an example of a method for capturing instructions and reproducing instructions in in a follower vehicle.

Example Method for Capturing Instructions and Reproducing Instructions in a Follower Vehicle FIG. 3 is a flow diagram depicting an example method of capturing instructions and reproducing instructions in a follower vehicle 300, according to some embodiments. The flow diagram is provided for the purpose of facilitating description of aspects of some embodiments. The diagram does not attempt to illustrate all aspects of the disclosure and should not be considered limiting.

At block 302, the system can capture the first driver's instructions. As described with reference to FIG. 2A, the first driver's instructions can be verbal instructions 240, maneuver instructions 256, and/or visual data 254.

At block 304, the system can tag the first driver's instructions with a GPS location. As described with reference to FIG. 2A, the location data interface 212 can receive GPS coordinates for the real-time location of the first vehicle from the satellite-linked position receiver 226. The system can tag the first driver's instructions with the GPS coordinates.

At block 306, the system can broadcast the first driver's location-tagged instructions to a second driver. A second driver can be any driver following the first driver. As described with reference to FIG. 2A, the system can send a maneuver instructions payload 238 from the first driver of the first vehicle to a second vehicle of a second vehicle via the wireless data interface 206 and transceiver 220. A second vehicle can receive the maneuver instructions payload 238 with the transceiver 220 located with the second vehicle, and the maneuvers instructions payload 238 can be stored in the memory system 234 located with the second vehicle.

At block 308, the system can reproduce the first driver's instructions. As described with reference to FIG. 2A, the system receives the GPS coordinates for the real-time location of the second vehicle via the location data interface 212 and satellite-linked position receiver 226. The system determines that the real-time location of the second vehicle is within a threshold distance of the GPS location of the location-tagged first driver's instructions and reproduces the first driver's instructions to the second driver.

As discussed, FIG. 3 illustrates an example embodiment of a method of providing direction guidance. Other embodiments can include one or more other criteria described with reference to FIG. 3 and/or other suitable criteria for accomplishing one or more objectives set forth in this disclosure. Such embodiments, which may omit or add to one or more the steps shown in the flow diagram of FIG. 3, are within the scope of this disclosure.

Figure 4:
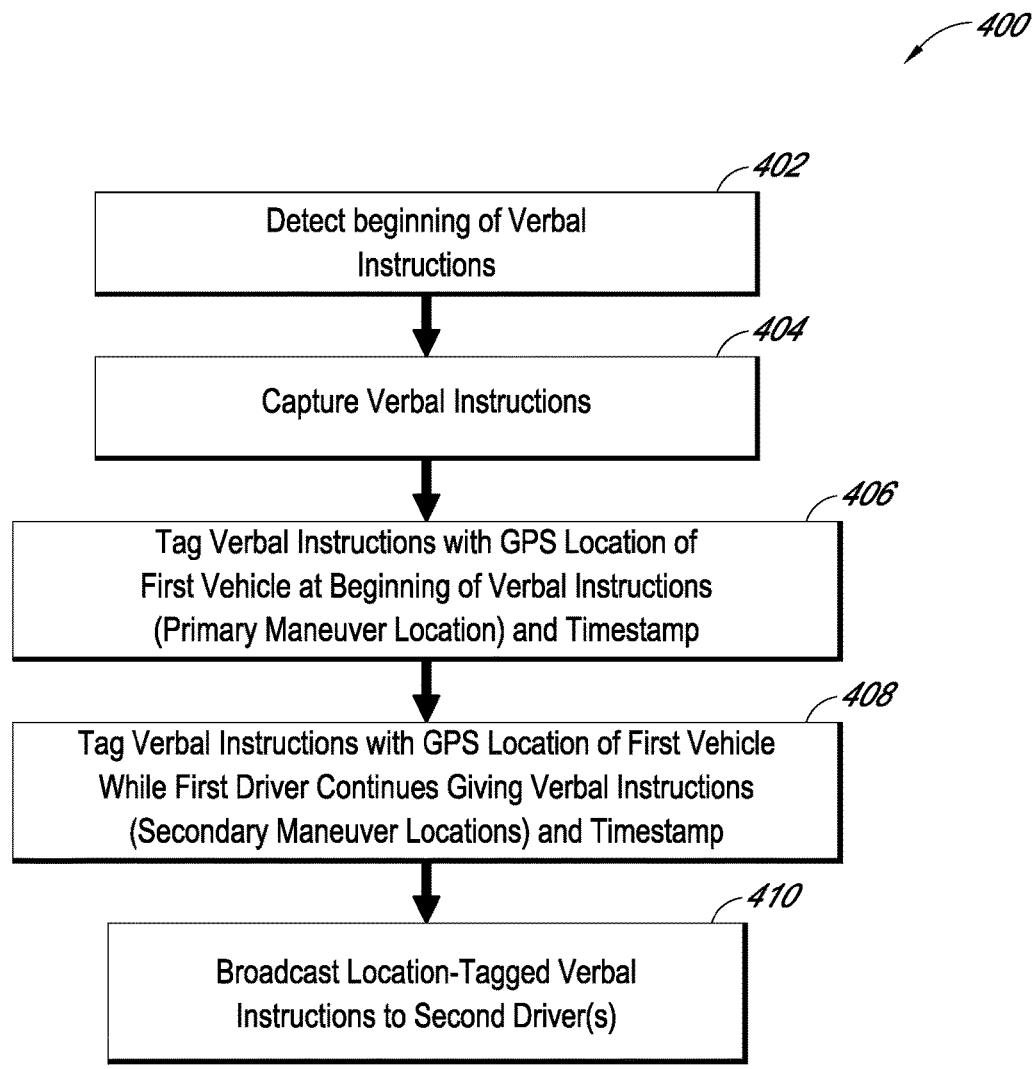
FIG. 4 illustrates an example of a method for creating instructions payload based on instructions verbalized in a leader vehicle.

Example Method for Capturing Instructions Payload Based on Instructions Verbalized in Leader Vehicle FIG. 4 is a flow diagram depicting an example method for capturing instructions payload based on instructions verbalized in leader vehicle 400, according to some embodiments. The flow diagram is provided for the purpose of facilitating description of aspects of some embodiments. The diagram does not attempt to illustrate all aspects of the disclosure and should not be considered limiting.

At block 402, the system can detect the beginning of the verbal instructions. The verbal instructions can be verbalized instructions from the first driver of the first vehicle and/or it can be instructions verbalized from a passenger in the first vehicle. The system can detect the beginning of the verbalized instructions by detecting when the first driver or passenger in the first vehicle begins to speak. In some embodiments, the system can detect the beginning of the verbalized instructions by detecting that the first driver or passenger has stated a keyword. In some embodiments, the system can detect the beginning of the verbalized instructions by detecting that the first driver or passenger has spoken at or above a threshold volume. This threshold volume can be a decibel level. In some embodiments, the system can detect the beginning of the verbalized instructions by detecting that the first driver or a passenger has pressed a button or performed another physical operation, such as performing a certain driving maneuver like taking a turn of more than 30 degrees, to signify the beginning of the verbal instructions.

At block 404, the system can capture the verbal instructions. The system can record the verbalized instructions using the microphone 232 and microphone interface 218 as described with reference to FIG. 2A. The recorded verbalized instructions can be stored in the memory system 234 as described with reference to FIG. 2A.

At block 406, the system can tag the verbal instructions with a timestamp and the GPS location of the first vehicle at the beginning of the verbal instructions. As described with reference to FIG. 2A, the location data interface 212 can receive the GPS location for the real-time location of the first vehicle from the satellite-linked position receiver 226. In some embodiments, the location data interface 212 can receive geopositioning information from a network (such as the internet, 3G/Wi-Fi/LTE/5G networks, etc.) to determine the GPS location of the first vehicle. In some embodiments, the location data interface 212 may receive, where applicable, alternate position information or information that can be used for location determination (such as cellular and/or Wi-Fi signal that can be used to triangulate a location) and determine the GPS location of the first vehicle. The GPS coordinates of the first vehicle when the verbalized instructions began can be referred to as a primary maneuver coordinates, and the location can be referred to as a primary maneuver location. The system can tag the beginning of the verbal instructions with the primary maneuver coordinates that correspond to the primary maneuver location. The system can tag the beginning of the verbal instructions with a timestamp.

At block 408, the system can tag the verbal instructions with a time stamp and the GPS location of the first vehicle while the first driver or passenger in the first vehicle continues giving verbal instructions. The GPS coordinates of the first vehicle when the first driver or passenger in the first vehicle continues giving verbalized instructions can be referred to as secondary maneuver location coordinates, and the location can be referred to as a secondary maneuver location. In some embodiments, secondary maneuver location coordinates are tagged in a leader driver's verbal instructions at the secondary maneuver location when the leader driver continues giving verbal instructions after a time interval and or set of time intervals (e.g., 5 seconds, 30 seconds, 1 minute, etc.). In some embodiments, secondary maneuver location coordinates are tagged in a leader driver's verbal instructions at the secondary maneuver location when the leader driver continues giving verbal instructions and the leader vehicle performs a certain driving maneuver, such as a turn of more than 30 degrees. In some embodiments, secondary maneuver location coordinates are tagged in a leader driver's verbal instructions at the secondary maneuver location when the leader driver continues giving verbal instructions and the leader driver indicates that secondary maneuver location coordinates 246 should be tagged. In some embodiments, the leader driver can indicate that secondary maneuver location coordinates should be tagged by speaking a keyword, pressing a button, or in some other manner.

At block 410, the system can broadcast location-tagged verbal instructions to a second driver. As described with reference to FIG. 2A, the transceiver 220 and wireless data interface 206 can be used to broadcast a maneuver instructions payload 238 that includes verbal instructions 240. Once the verbal instructions are location-tagged, the system can send the verbal instructions to a second vehicle via the transceiver 220 and wireless data interface 206. In some embodiments, the verbal instructions can be sent to all second vehicles. In some embodiments, the verbal instructions can be sent to at least one intended recipient. The system can determine that the first driver or passenger of the first vehicle has spoken a recipient keyword in the verbal instructions that identifies at least one recipient, and in response to the system determining that a recipient keyword was included, the system can identify at least one corresponding intended recipient and broadcast the location-tagged verbal instructions to the at least one intended recipient. In some embodiments, the location-tagged verbal instructions can be sent to all second vehicles, but the verbal instructions will only be reproduced for the at least one intended recipient.

As discussed, FIG. 4 illustrates an example embodiment of a method of providing direction guidance. Other embodiments can include one or more other criteria described with reference to FIG. 4 and/or other suitable criteria for accomplishing one or more objectives set forth in this disclosure. Such embodiments, which may omit or add to one or more the steps shown in the flow diagram of FIG. 4, are within the scope of this disclosure.

Example Message Path

FIG. 5 is a drawing depicting an example embodiment of a message path 500, according to some embodiments. The drawing is provided for the purpose of facilitating description of aspects of some embodiments. The drawing does not attempt to illustrate all aspects of the disclosure and should not be considered limiting.

As described in reference to FIG. 4, verbal instructions can be timestamped and tagged with primary maneuver coordinates at the primary maneuver location and secondary maneuver coordinates at the secondary maneuver location. In some embodiments, the system can create a message path with the primary maneuver location, secondary maneuver locations, and a path. As illustrated in FIG. 5, in some embodiments, the primary maneuver location 502 is the beginning of the message path 500. The secondary maneuver locations 504, 506, 508, 510, and 512 are subsequent to the primary maneuver location 502. In some embodiments, the system can order the primary maneuver location 502 and secondary maneuver locations 504, 506, 508, 510, and 512 using the timestamp information and/or GPS coordinates provided with the location-tagged verbal instructions. In some embodiments, the system can connect the primary maneuver location 502 and the secondary maneuver locations 504, 506, 508, 510, and 512 with the path 514.

In some embodiments, the path 514 is the GPS recorded path of the first vehicle. In some embodiments, the path 514 is made of straight line segments connecting the primary maneuver location 502 and the secondary maneuver locations 504, 506, 508, 510, and 512. In some embodiments, the system uses route predicting software to create a path 514 with predictive curvature between the primary maneuver location 502 and the secondary maneuver locations 504, 506, 508, 510, and 512. In some embodiments, the system can create a message path that includes only primary maneuver locations. In some embodiments, the system can create a message path that includes all the primary maneuver locations and secondary maneuver locations for an off-roading trip. In some embodiments, the system can create a message path that includes all the primary maneuver locations, secondary maneuver locations, and shorter message paths that comprise an off-roading trip.

As discussed, FIG. 5 illustrates an example embodiment of a message path. Other embodiments can include one or more other criteria described with reference to FIG. 5. Embodiments that may omit or add to one or more features to the example message path of FIG. 5 are within the scope of this disclosure.

Example Message Path with a Leader Vehicle and Follower Vehicles

Figure 6:
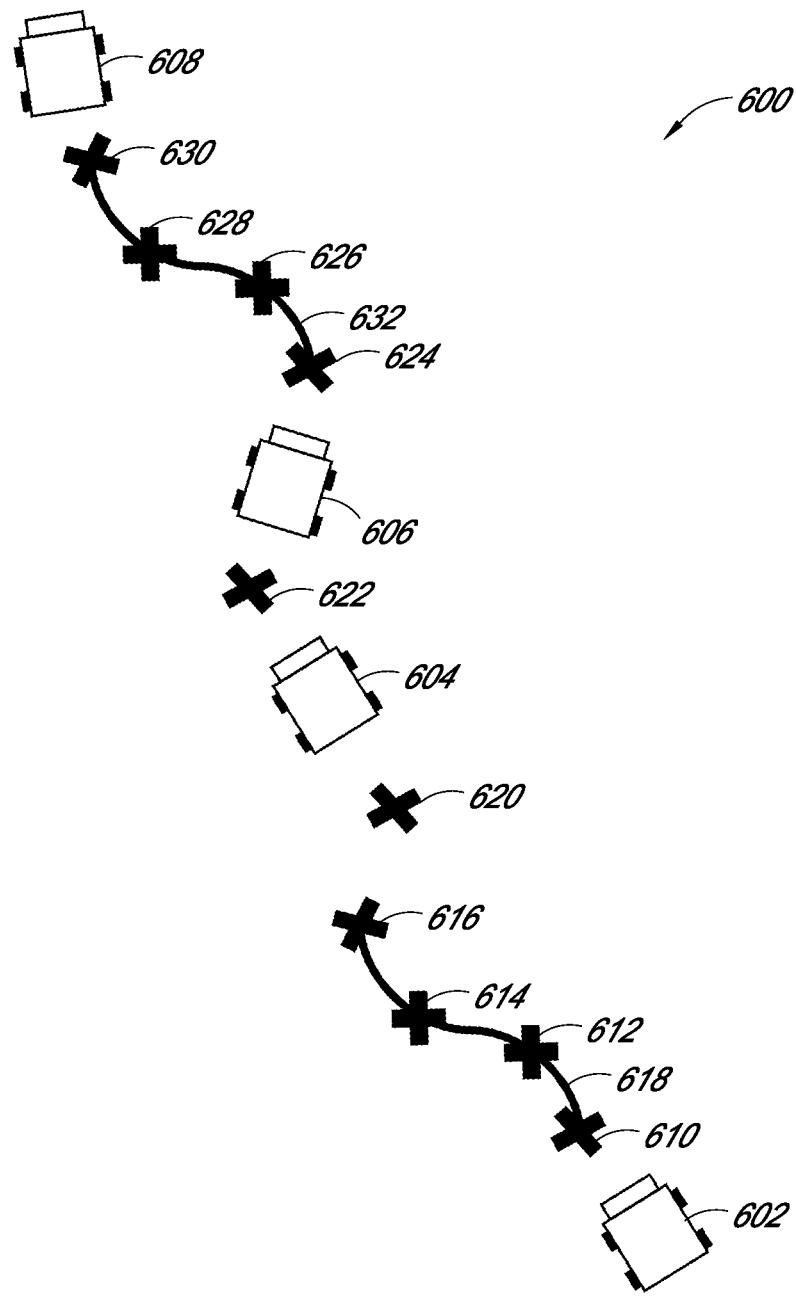
FIG. 6 illustrates an example of a message path with a leader vehicle and follower vehicles.

FIG. 6 is a drawing depicting an example embodiment of a message path with a leader vehicle and follower vehicles 600, according to some embodiments. The drawing is provided for the purpose of facilitating description of aspects of some embodiments. The drawing does not attempt to illustrate all aspects of the disclosure and should not be considered limiting.

As illustrated in FIG. 6, the leader vehicle 608 has broadcast location-tagged verbal instructions to follower vehicles 602, 604, and 606. Message path 618 includes a primary maneuver location 610 with secondary maneuver locations 612, 614, and 616 all connected by a path. There is a singular primary maneuver location 620 and singular primary maneuver location 622. Message path 632 includes a primary maneuver location 624 with secondary maneuver locations 626, 628, and 630 all connected by a path. Follower vehicles 602, 604, and 606 can supplement or override the verbal instructions broadcast by the leader vehicle 608. Follower vehicles 602, 604 and 606 are all following leader vehicle 608, but the system can determine if a follower vehicle becomes the leader vehicle by comparing the real-time vehicle location of all the vehicles in a caravan. The new leader vehicle would then broadcast verbal instructions to all follower vehicles. In some embodiments, the message path 618, primary maneuver location 620, primary maneuver location 622, and message path 632 are all part of a larger message path.

Figures 10A, 10B:
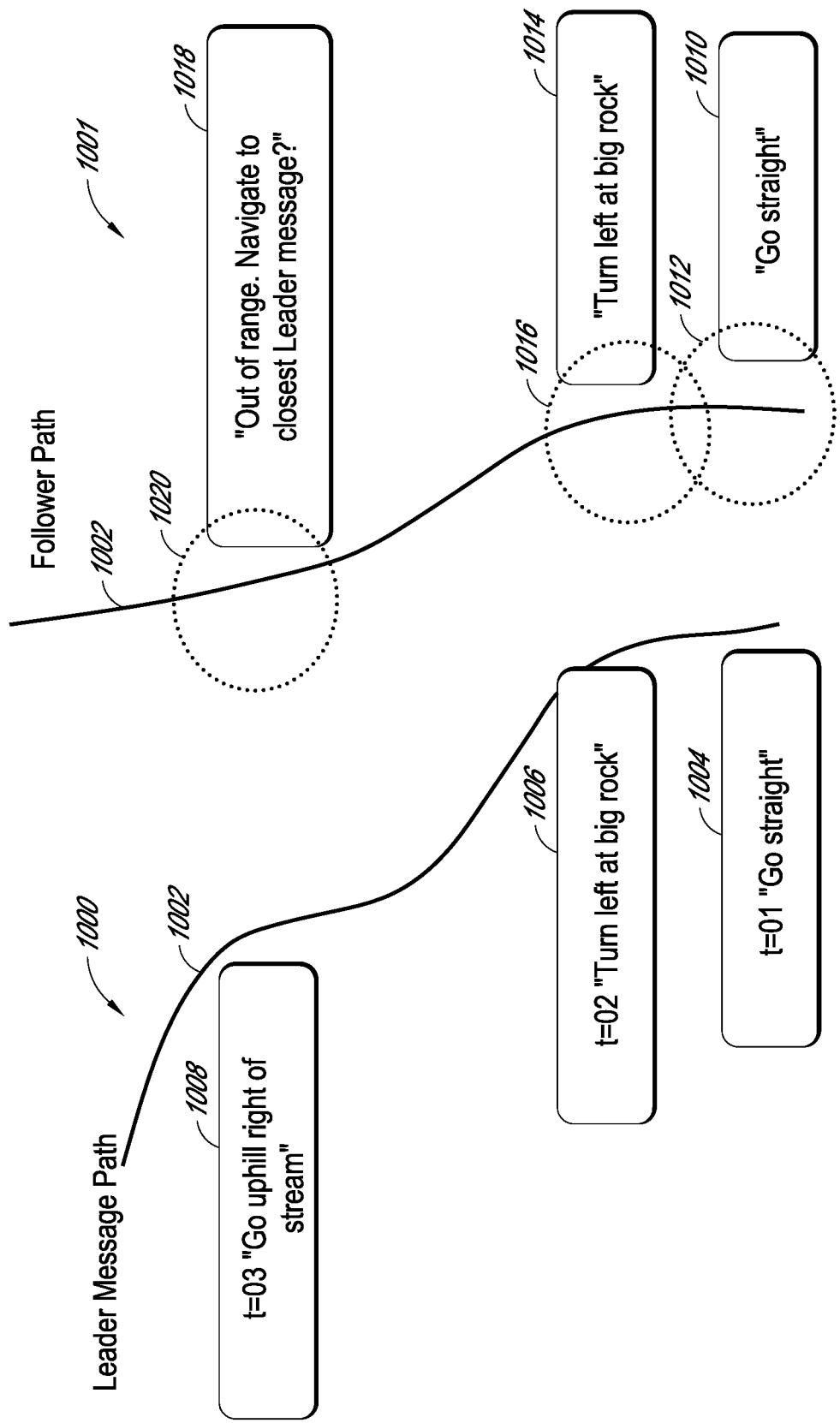
FIG. 10A illustrates an example of a leader message path.
FIG. 10B illustrates an example of a follower path.

As discussed, FIG. 6 illustrates an example embodiment of a message path with a leader vehicle and follower vehicles. Other embodiments can include one or more other criteria described with reference to FIG. 10A. Embodiments that may omit or add to one or more features to the example leader message path of FIG. 10A are within the scope of this disclosure.

Example Method for Creating Instructions Payload Comprising Visual Data

Figure 7:
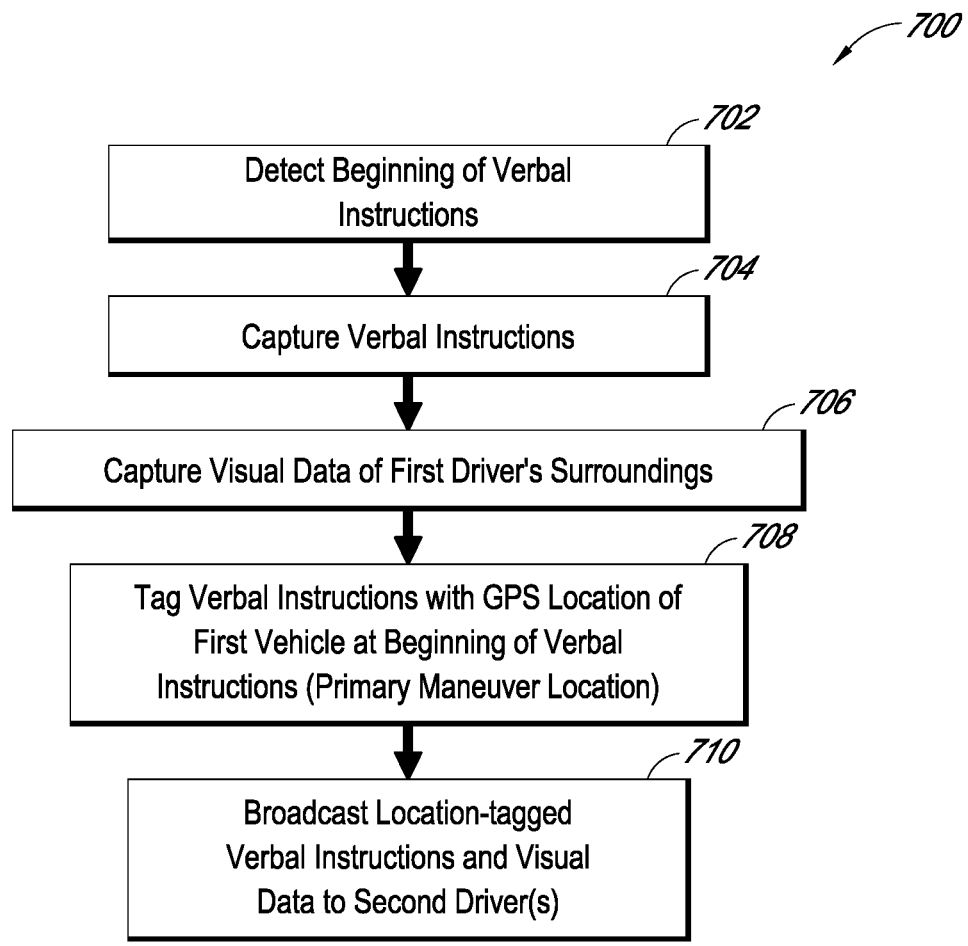
FIG. 7 illustrates an example of a method for creating an instructions payload with visual data.

FIG. 7 is a flow diagram depicting an example method for creating instructions payload comprising visual data 700, according to some embodiments. The flow diagram is provided for the purpose of facilitating description of aspects of some embodiments. The diagram does not attempt to illustrate all aspects of the disclosure and should not be considered limiting.

At block 702, the system can detect the beginning of the verbal instructions by the first driver or passenger in the first vehicle. Block 702 has the same description as described in reference to block 402 of FIG. 4.

At block 704, the system can capture the verbal instructions of the first driver or passenger in the first vehicle. Block 704 has the same description as described in reference to block 404 of FIG. 4.

At block 706, the system can capture the visual data of the first driver's surroundings when the first driver or a passenger of the first vehicle begins the verbal instructions. As described in reference to FIG. 2A, the camera interface 208 can receive input from a camera 222 that can be used to capture visual data 254. Visual data includes, but is not limited to, images and videos. In some embodiments, the camera begins capturing video at the beginning of the verbal instructions and stops capturing video at the verbal instructions conclusion. In some embodiments, the camera captures a photo at the beginning of the verbal instructions. In some embodiments, the camera captures a photo at any subsequent secondary maneuver locations.

At block 708, the system can tag the verbal instructions with the GPS location of the first vehicle at the beginning of the verbal instructions. Block 708 has the same description as described in reference to block 406 of FIG. 4.

At block 710, the system can broadcast location-tagged verbal instructions and visual data to a second driver in a maneuverer instructions payload. Block 710 has the same description as described in reference to block 410 of FIG. 4 with the addition that the captured visual data described in block 706 is broadcast with the location-tagged verbal instructions in the same maneuver instructions payload 238 as described in reference to FIG. 2A.

As discussed, FIG. 7 illustrates an example embodiment of a method for creating instructions payload comprising visual data. Other embodiments can include one or more other criteria described with reference to FIG. 7 and/or other suitable criteria for accomplishing one or more objectives set forth in this disclosure. Such embodiments, which may omit or add to one or more the steps shown in the flow diagram of FIG. 7, are within the scope of this disclosure.

Example Method for Reproducing Leader Instructions in a Follower Vehicle

Figure 8:
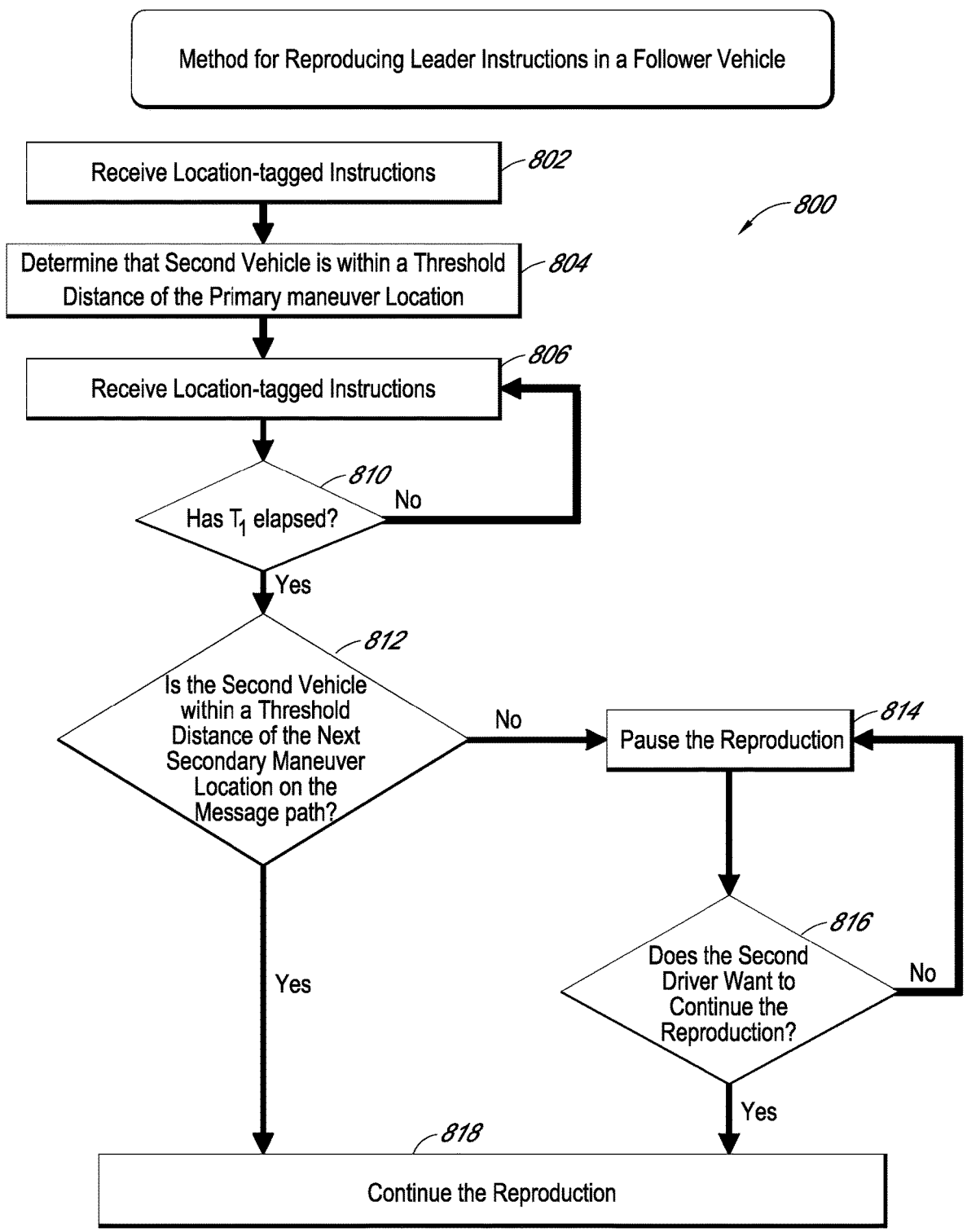
FIG. 8 illustrates an example of a method for reproducing leader instructions in a follower vehicle.

FIG. 8 is a flow diagram depicting an example method for reproducing leader instructions in a follower vehicle 800, according to some embodiments. The flow diagram is provided for the purpose of facilitating description of aspects of some embodiments. The diagram does not attempt to illustrate all aspects of the disclosure and should not be considered limiting.

At block 802, a second vehicle can receive location-tagged maneuver instructions from a first vehicle. As described in reference to FIG. 2A, the location-tagged maneuver instructions comes in a maneuver instructions payload 238. The second driver can receive the maneuver instructions payload 238 from the first vehicle via the transceiver 220 and wireless data interface 206. The maneuver instructions payload 238 can include verbal instructions 240, primary maneuver location coordinates 242, primary maneuver location timestamp 244, secondary maneuver location coordinates 246, secondary maneuver location timestamp 248, message path 252, visual data 254, maneuver instructions 256, and/or other data. The maneuver instructions payload 238 can be stored in the memory system 234.

At block 804, the system can determine that the second vehicle is within a threshold distance of the primary maneuver location. As described with reference to FIG. 2A, the system receives the GPS coordinates for the real-time location of the second vehicle via the location data interface 212 and satellite-linked position receiver 226. The system determines that the real-time location of the second vehicle is within a threshold distance of the primary maneuver location of a location-tagged maneuver instruction.

Figure 11:
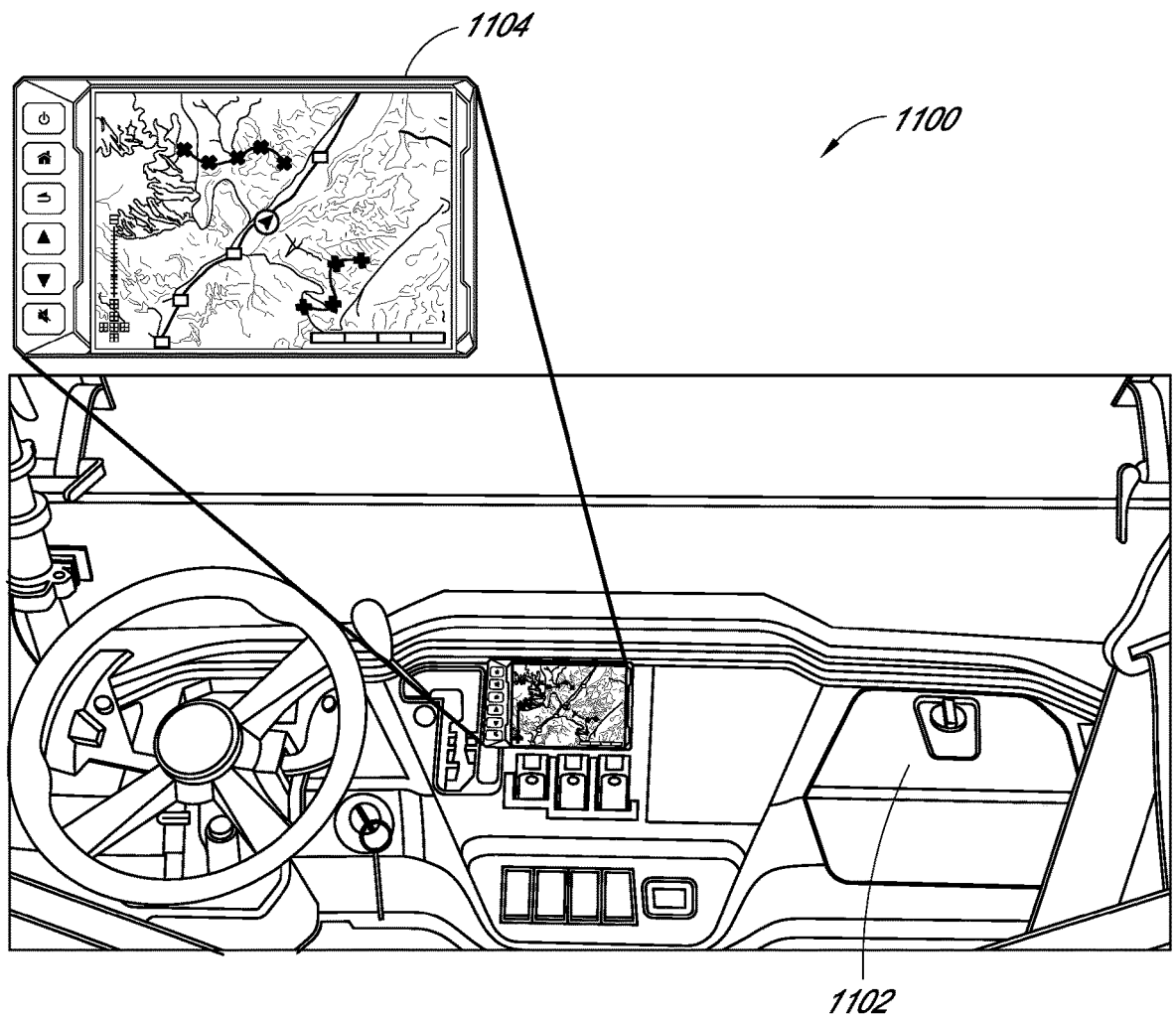
FIG. 11 illustrates an example of a graphical user interface mounted in an off-road vehicle.
Figure 12:
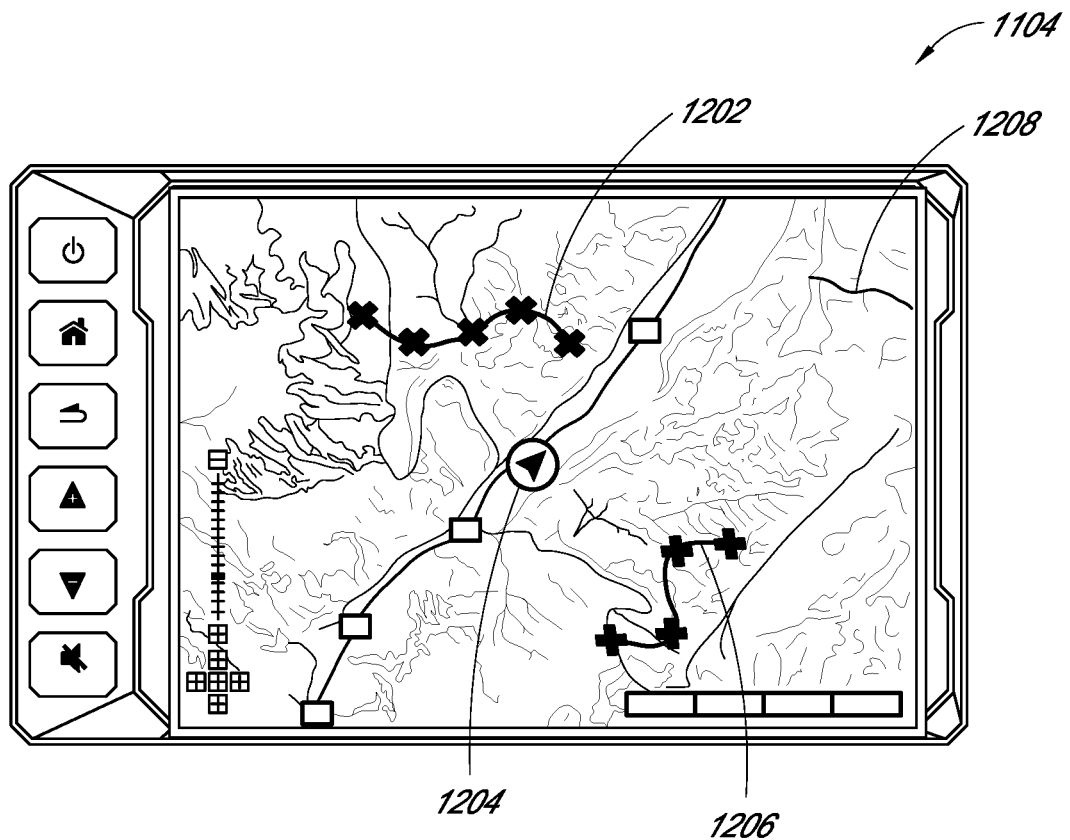
FIG. 12 illustrates an example of a graphical user interface connected to a vehicle-to-vehicle communications system.
Figure 14:
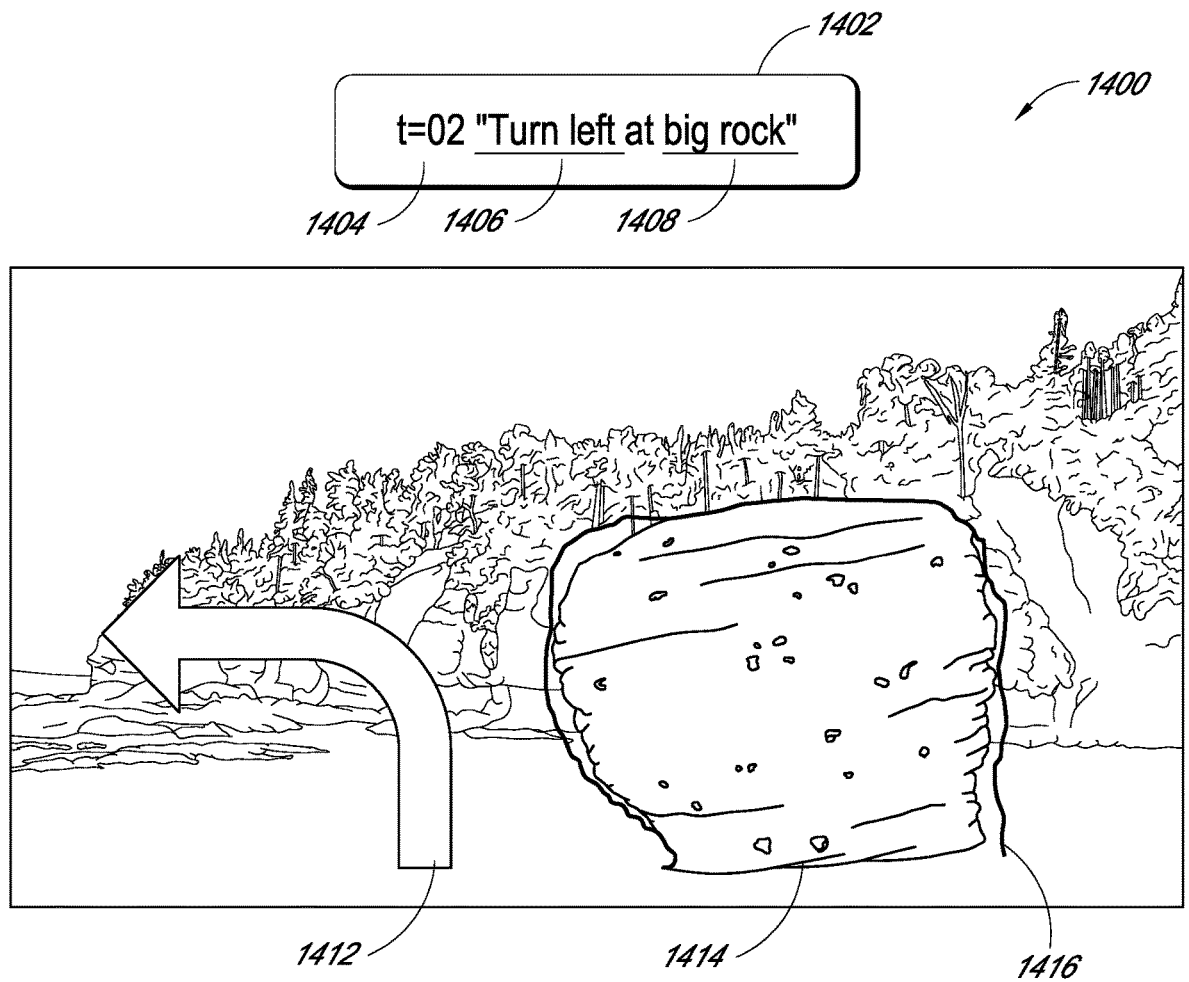
FIG. 14 illustrates an example of a visual reproduction of an instructions payload comprising navigation and landmark markers.

At block 806, the system can reproduce the location-tagged maneuver instructions in a manner perceivable to the second driver of the second vehicle. In some embodiments, the system can reproduce the verbal instructions via a microphone. In some embodiments, the system can reproduce the verbal instructions as text on a display such as depicted in FIG. 14. In some embodiments, the system can reproduce the visual data on a graphical user interface as depicted in FIG. 14. In some embodiments, the system can display a message path on a graphical user interface as depicted in FIG. 11 and FIG. 12

At block 810, the system asks if $T_1$ has elapsed. In some embodiments, $T_1$ is the duration of time that passed between when the first vehicle traveled from the primary maneuver location to a secondary maneuver location. When the system determines that $T_1$ has not elapsed, the system continues to reproduce the location tagged maneuver instructions detailed in block 806. When the system determines that $T_1$ has elapsed, the system continues onto block 812.

At block 812, the system asks if the second vehicle is within a threshold distance of the next secondary maneuver location on the message path. As described with reference to FIG. 2A, the system receives the GPS coordinates for the real-time location of the second vehicle via the location data interface 212 and satellite-linked position receiver 226. The system can determine when the real-time location of the second vehicle is within a threshold distance of the next secondary maneuver location on the message path. When the real-time location of the second vehicle is within a threshold distance of the next secondary maneuver location on the message path, the system moves to block 818. When the real-time location of the second vehicle is not within a threshold distance of the next secondary maneuver location on the message path, the system moves to block 814.

At block 814, the system pauses the reproduction of the location-tagged maneuver instructions.

At block 815, the system asks if the second drive if the second driver wants to continue the reproduction of the location-tagged maneuver instructions. In some embodiments, the system verbally asks the second driver by producing audio via the speaker and speaker interface as described in reference to FIG. 2A. In some embodiments, the system ask the second driver by depicting a question on a display screen. In some embodiments, the system can accept a second driver input response via a user interface. In some embodiments, the system can accept a second driver input response via the second driver speaking into a microphone. In some embodiments, the system can accept a second driver input response via a gesture of the second driver. The system can capture the gesture via the camera 222 and camera interface 208 as described in reference to FIG. 2A, and with a gesture recognition algorithm that is stored on the memory system 234, the system can determine a second driver's response. When the second driver indicates that the second driver does not want to continue the reproduction, the system moves to block 814. When the second driver indicates that the second driver does want to continue the reproduction, the system moves to block 818.

At block 818, the system continues the reproduction of the location-tagged maneuver instructions. In some embodiments, the system may move to block 810 when there are subsequent secondary maneuver locations on the same message path but ask if $T_n$ has elapsed. In some embodiments, $T_n$ can be the duration of time that passed between when the first vehicle traveled from the a given secondary maneuver location to a subsequent secondary maneuver location. In some embodiments, this could repeat until the second vehicle has navigated to the last secondary maneuver location on a given message path.

As discussed, FIG. 8 illustrates an example embodiment of a method for reproducing leader instructions in a follower vehicle. Other embodiments can include one or more other criteria described with reference to FIG. 8 and/or other suitable criteria for accomplishing one or more objectives set forth in this disclosure. Such embodiments, which may omit or add to one or more the steps shown in the flow diagram of FIG. 8, are within the scope of this disclosure.

Figure 9A:
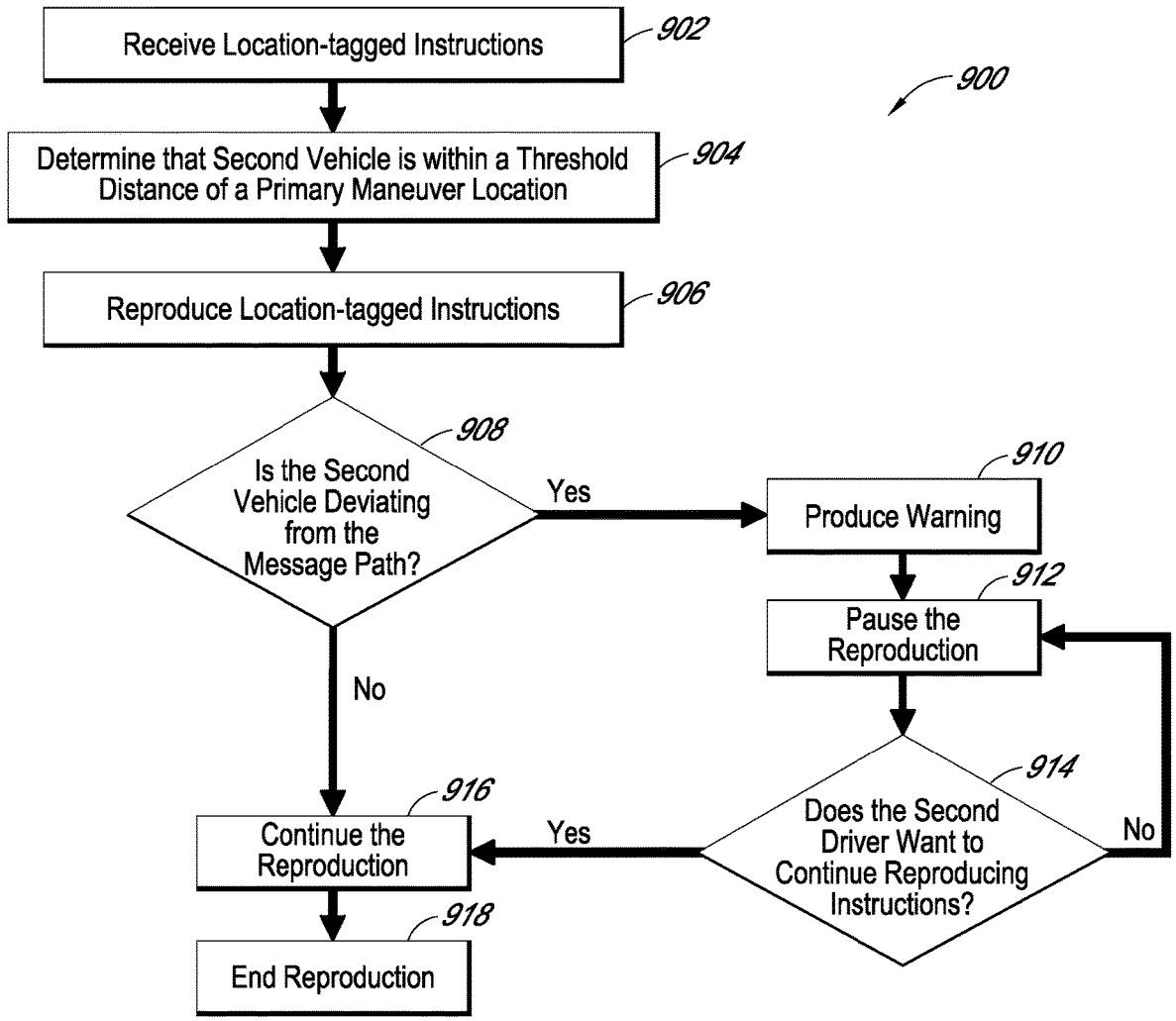
FIG. 9A illustrates an example of a method for reproducing leader instructions in a follower vehicle when the follower vehicle deviates from the message path.

Example Method for Reproducing Leader Instructions in a Follower Vehicle when the Follower Vehicle Deviates from the Message Path FIG. 9A is a flow diagram depicting an example method for reproducing leader instructions in a follower vehicle when the follower vehicle deviates from the message path 900, according to some embodiments. The flow diagram is provided for the purpose of facilitating description of aspects of some embodiments. The diagram does not attempt to illustrate all aspects of the disclosure and should not be considered limiting.

At block 902, the system receives location-tagged maneuver instructions. Block 902 has the same description as described in reference to block 802 of FIG. 8.

At block 904, the system determines that the second vehicle is within a threshold distance of a primary maneuver location. Block 904 has the same description as described in reference to block 804 of FIG. 8.

At block 906, the system reproduces the location-tagged instructions. Block 906 has the same description as described in reference to block 806 of FIG. 8.

At block 908, the system asks if the second vehicle is deviating from the message path. As described with reference to FIG. 2A, the system receives the GPS coordinates for the real-time location of the second vehicle via the location data interface 212 and satellite-linked position receiver 226. The system can determine that the second vehicle is deviating from the message path when the distance between the real-time vehicle location of the second vehicle and the message path exceeds a threshold distance. When the deviation exceeds a threshold distance, the system moves to block 910. When the deviation does not exceed a threshold distance the system moves to block 916.

At block 910, the system produces a warning perceivable by the second driver. In some embodiments, the warning is an audio warning that the system outputs via the speaker 230 and speaker interface 216 described in reference to FIG. 2A. In some embodiments, the warning is displayed via the display 228 and display interface 214 described in reference to FIG. 2A. After the warning is displayed, the system moves to block 912.

At block 912, the system pauses the reproduction of the location-tagged maneuver instructions. After the system pauses the reproduction, the system moves to block 914.

At block 914, the system asks if the second driver wants to continue reproducing the location-tagged maneuver instructions. In some embodiments, the system verbally asks the second driver by producing audio via the speaker and speaker interface as described in reference to FIG. 2A. In some embodiments, the system ask the second driver by depicting a question on a display screen. In some embodiments, the system can accept a second driver input response via a user interface. In some embodiments, the system can accept a second driver input response via the second driver speaking into a microphone. In some embodiments, the system can accept a second driver input response via a gesture of the second driver. The system can capture the gesture via the camera 222 and camera interface 208 as described in reference to FIG. 2A, and with a gesture recognition algorithm that is stored on the memory system 234, the system can determine a second driver's response. When the second driver indicates that the second driver does not want to continue the reproduction, the system moves to block 912. When the second driver indicates that the second driver does want to continue the reproduction, the system moves to block 916.

At block 916, the system continues to reproduce the location-tagged maneuver instructions. After continuing the reproduction to its conclusion, the system moves to block 918.

At block 918, the system ends the reproduction of the location-tagged maneuver instructions once the system has determined that the reproduction is complete.

As discussed, FIG. 9A illustrates an example embodiment of a method for reproducing leader instructions in a follower vehicle when the follower vehicle deviates from the message path. Other embodiments can include one or more other criteria described with reference to FIG. 9A and/or other suitable criteria for accomplishing one or more objectives set forth in this disclosure. Such embodiments, which may omit or add to one or more the steps shown in the flow diagram of FIG. 9A, are within the scope of this disclosure.

Figure 9B:
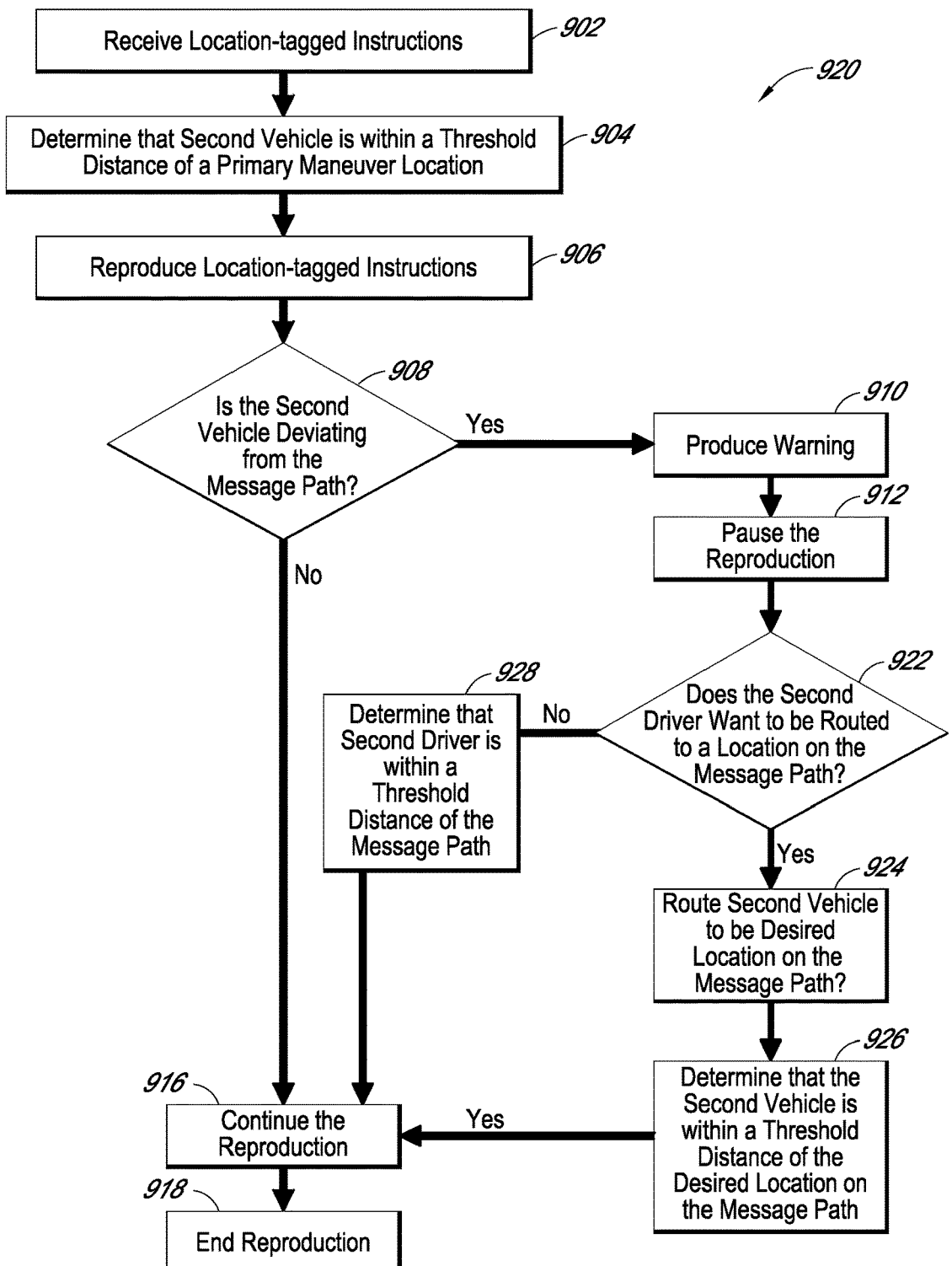
FIG. 9B illustrates an example of a method for reproducing leader instructions in a follower vehicle when the follower vehicle wants to be routed back to the message path.

Example Method for Reproducing Leader Instructions in a Follower Vehicle when the Driver of the Follower Vehicle Wants to be Routed Back to the Message Path FIG. 9B is a flow diagram depicting an example method for reproducing leader instructions in a follower vehicle when the driver of the follower vehicle wants to be routed back to the message path 920, according to some embodiments. The flow diagram is provided for the purpose of facilitating description of aspects of some embodiments. The diagram does not attempt to illustrate all aspects of the disclosure and should not be considered limiting.

Blocks 902, 904, 906, 908, 910, 912, 916, and 918 are describe in reference to FIG. 9A.

At block 922, the system asks the second driver if the second driver wants to be routed to a location on the message path. The manner in which the system asks the second driver for input and the manner in which the system accepts a second driver input is includes the modes described in block 914 of FIG. 9A. In some embodiments, the system can display the message path on a display screen. The system can display the message path superimposed on a map. The system can display the real-time location of the second vehicle. The system can display the real-time location of the first vehicle and any other second vehicles. In some embodiments, the system can accept a second driver input response via selecting a point on the message path. When the system determines that the second driver wants to be routed to a location on the message path, the system moves to block 924. When the system determines that the second driver does not want to be routed to a location on the message path, the system moves to block 928.

At block 924, the system routes the second vehicle to the desired location on the message path. In some embodiments, the system routes the second vehicle to the desired location on the message path with audible instructions provided to the second driver via a speaker and speaker interface. In some embodiments, the system routes the second vehicle to the desired location on the message path with visual instructions provided to the second driver via a speaker and speaker interface.

At block 926, the system determines that the second vehicle is within a threshold distance of the desired location on the message path. As described with reference to FIG. 2A, the system receives the GPS coordinates for the real-time location of the second vehicle via the location data interface 212 and satellite-linked position receiver 226. The system can determine that the second vehicle is within a threshold distance of the desired location on the message path by the determining the distance between the real-time vehicle location of the second vehicle and the desired location on the message path. When system determines that the second vehicle is within a threshold distance, the system moves to block 916.

At block 928, the system determines that the second vehicle is within a threshold distance of the message path. Block 928 is described in block 926 with the difference that the system determines that the second vehicle is within a threshold distance of the message path, not a desired location on the message path. When the system determines that the second vehicle is within a threshold distance, the system moves to block 916.

As discussed, FIG. 9B illustrates an example embodiment of a method for reproducing leader instructions in a follower vehicle when the follower vehicle deviates from the message path. Other embodiments can include one or more other criteria described with reference to FIG. 9B and/or other suitable criteria for accomplishing one or more objectives set forth in this disclosure. Such embodiments, which may omit or add to one or more the steps shown in the flow diagram of FIG. 9B, are within the scope of this disclosure.

Example Leader Message Path

FIG. 10A is a drawing depicting an example leader message path 1000, according to some embodiments. The drawing is provided for the purpose of facilitating description of aspects of some embodiments. The drawing does not attempt to illustrate all aspects of the disclosure and should not be considered limiting.

As illustrated in FIG. 10A, the leader message path 1000 includes a first location-tagged maneuver instruction 1004, second location-tagged maneuver instruction 1006, and a third location-tagged maneuver instruction 1008. Each location-tagged maneuver instruction includes verbal instructions, a timestamp, and GPS coordinates corresponding to when the first driver gave the verbal instructions. The GPS recorded path of the first vehicle 1002 connects the GPS locations of the first location-tagged maneuver instruction 1004, second location-tagged maneuver instruction 1006, and a third location-tagged maneuver instruction 1008.

As discussed, FIG. 10A illustrates an example leader message path. Other embodiments can include one or more other criteria described with reference to FIG. 10A. Embodiments that may omit or add to one or more features to the example leader message path of FIG. 10A are within the scope of this disclosure.

Example Follower Path

FIG. 10B is a drawing depicting an example follower message path 1001, according to some embodiments. The drawing is provided for the purpose of facilitating description of aspects of some embodiments. The drawing does not attempt to illustrate all aspects of the disclosure and should not be considered limiting.

As illustrated in FIG. 10B, the follower path 1001 includes the GPS recorded path of the second vehicle 1022. The first reproduction location 1012 indicates the location where the reproduced first location-tagged maneuver instruction 1010 was reproduced to the second driver. The second reproduction location 1016 indicates the location where the reproduced second location-tagged maneuver instruction 1014 was reproduced to the second driver. The third reproduction location 1020 indicates the location where the second driver received a warning and prompt to route message 1018 because the second driver had deviated from the leader message path 1000 as described in reference to FIG. 10A. In one embodiment, the steps leading to the warning and prompt to route message 1018 are detailed in FIG. 9B.

As discussed, FIG. 10B illustrates an example follower path. Other embodiments can include one or more other criteria described with reference to FIG. 10B. Embodiments that may omit or add to one or more features to the follower path of FIG. 10B are within the scope of this disclosure.

Example Graphical User Interface Mounted in an Off-Road Vehicle

FIG. 11 is a drawing depicting an example graphical user interface mounted in an off-road vehicle 1100, according to some embodiments. The drawing is provided for the purpose of facilitating description of aspects of some embodiments. The drawing does not attempt to illustrate all aspects of the disclosure and should not be considered limiting.

As illustrated in FIG. 11, the graphical user interface mounted in an off-road vehicle 1100 includes a graphical user interface 1104 that can be mounted in a vehicle 1102. The graphical user interface 1104 can be the display 228 described in reference to FIG. 2A. In some embodiments, the graphical user interface 1106 is a touch screen and can receive input from a user touching the surface of the graphical user interface 1104. An example embodiment of what the graphical user interface can display is described in reference to FIG. 12.

As discussed, FIG. 11 illustrates an example graphical user interface mounted in an off-road vehicle. Other embodiments can include one or more other criteria described with reference to FIG. 11. Embodiments that may omit or add to one or more features to the graphical user interface mounted in an off-road vehicle of FIG. 11 are within the scope of this disclosure.

Example Graphical User Interface

FIG. 12 is a drawing depicting an example graphical user interface 1104, according to some embodiments. The drawing is provided for the purpose of facilitating description of aspects of some embodiments. The drawing does not attempt to illustrate all aspects of the disclosure and should not be considered limiting.

As illustrated in FIG. 12, the graphical user interface 1104 that can be mounted in a vehicle 1102. In some embodiments, the graphical user interface 1104 can display a map 1208 and the real-time vehicle location of the second vehicle 1204 superimposed on the map 1208. The graphical user interface 1104 can display message paths, such as message path 1202 and message path 1206. In some embodiments, the graphical user interface 1104 can display images, verbal instructions as text, videos, messages from the system requesting user input, and/or other information.

As discussed, FIG. 12 illustrates an example graphical user interface. Other embodiments can include one or more other criteria described with reference to FIG. 12. Embodiments that may omit or add to one or more features to the graphical user interface of FIG. 12 are within the scope of this disclosure.

Figure 13:
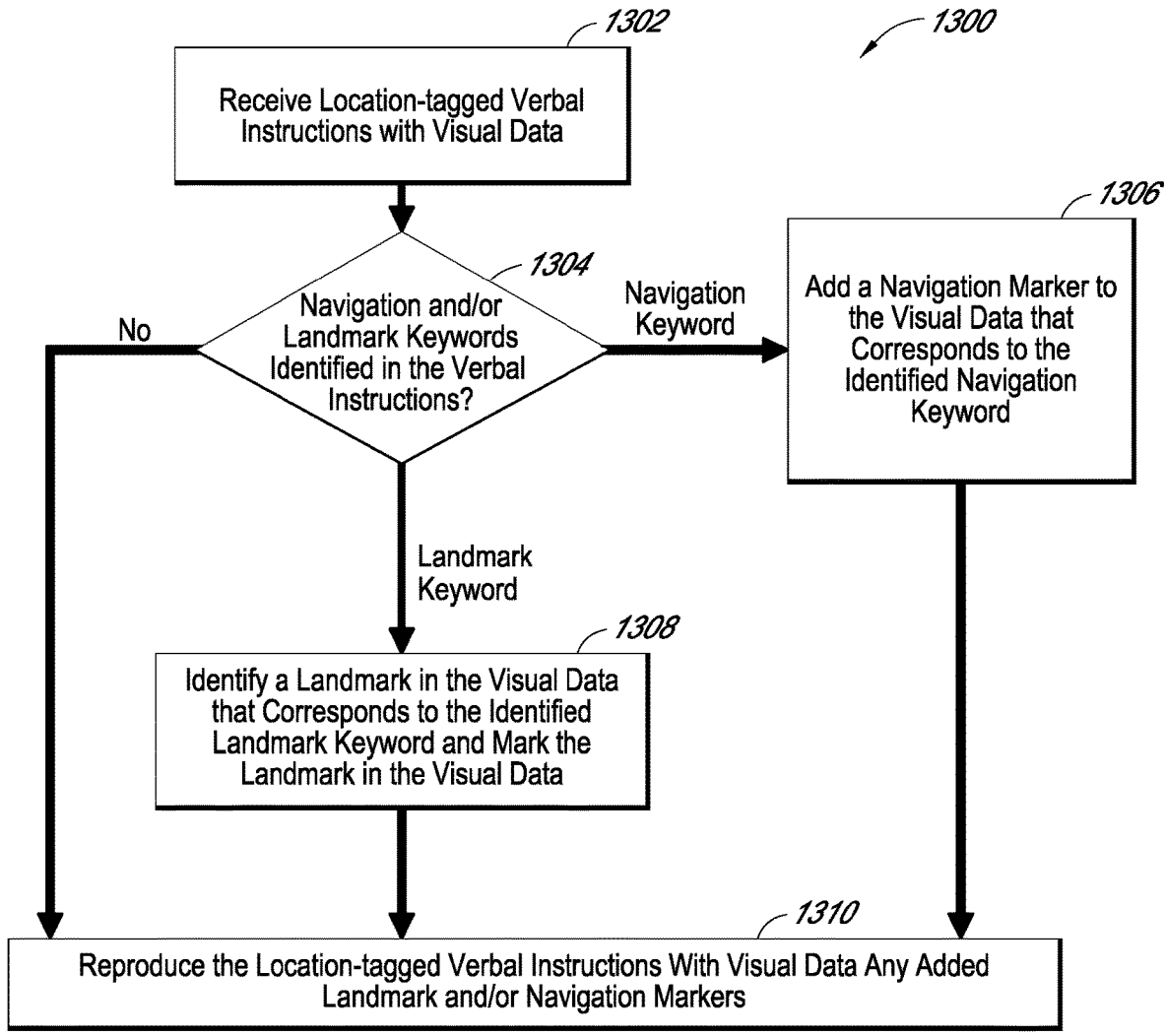
FIG. 13 illustrates an example of a method for creating an instructions payload comprising navigation and/or landmark markers.

Example Method for Creating Instructions Payload Comprising Navigation and/or Landmark Markers FIG. 13 is a flow diagram depicting an example method for creating instructions payload comprising navigation and/or landmark markers 1300, according to some embodiments. The flow diagram is provided for the purpose of facilitating description of aspects of some embodiments. The diagram does not attempt to illustrate all aspects of the disclosure and should not be considered limiting.

At block 1302, the system receives location-tagged verbal instructions with visual data. Block 1302 has the same description as described in reference to block 802 of FIG. 8. The visual data can be at least images and/or video.

At block 1304, the system asks whether there are any navigation and/or landmark keywords in the verbal instructions. In some embodiments, navigation keywords can include left, right, straight, backward, forward, curve, up, down, and/or other words used to navigate. In some embodiments, landmark keywords can include tree, rock, hill, mountain, river, lake, stream, log, ditch, valley, and/or other words used to describe landmarks. The system can determine if any navigation and/or landmark keywords are in the verbal instructions. When the system determines that a navigation keyword is in the verbal instructions, the system moves to block 1306. When the system determines that a landmark keyword is in the verbal instructions, the system moves to block 1308. When the system determines that no navigation keyword or landmark keyword is in the verbal instructions, the system moves to block 1310.

At block 1306, the system adds a navigation marker to the visual data that corresponds to the identified navigation keyword. A nonlimiting example is placing an arrow pointing right in response to the system identifying a keyword that says right. In some embodiments, the system adds a navigation marker to a map at the geospatial location where the leader driver spoke the navigation keyword. In some embodiments, the navigation marker will temporarily be placed in the visual data during reproduction but will be removed after a period of time. In response to adding a navigation marker to the visual data, the system can move to block 1310.

At block 1308, the system identifies a landmark in the visual data that corresponds to the identified landmark keyword and marks the landmark in the visual data. In some embodiments, the system uses an image recognition algorithm to identify a landmark in the visual data. Once the landmark is identified, the system marks the landmark to bring it to the attention of the second driver. In response to marking the landmark, the system moves to block 1310.

At block 1310, the system reproduces the location-tagged verbal instructions with visual data and any added landmark and/or navigation markers. In some embodiments, the system can reproduce the location the location-tagged verbal instructions with visual data and any added landmark and/or navigation markers on the graphical user interfaces as described in reference to FIG. 11, FIG. 12, FIG. 14, and/or display 228 of FIG. 2A.

As discussed, FIG. 13 illustrates an example embodiment of a method for creating instructions payload comprising navigation and/or landmark markers. Other embodiments can include one or more other criteria described with reference to FIG. 13 and/or other suitable criteria for accomplishing one or more objectives set forth in this disclosure. Such embodiments, which may omit or add to one or more the steps shown in the flow diagram of FIG. 13, are within the scope of this disclosure.

Example Visual Reproduction of an Instructions Payload Comprising Navigation and Landmark Markers FIG. 14 is a drawing depicting an example visual reproduction of an instructions payload comprising navigation and landmark markers 1400, according to some embodiments. The drawing is provided for the purpose of facilitating description of aspects of some embodiments. The drawing does not attempt to illustrate all aspects of the disclosure and should not be considered limiting.

As illustrated in FIG. 14, the visual reproduction of an instructions payload comprising navigation and/or landmark markers 1400 includes a visual depiction of the first driver's verbal instructions 1402. The visual depiction of the first driver's verbal instructions 1402 includes a timestamp 1404, navigation keywords "turn left" 1406, and/or landmark keywords "big rock." The visual reproduction of an instructions payload comprising navigation and/or landmark markers 1400 can include a navigation marker 1412 that corresponds to the navigation keywords "turn left" 1406 superimposed on the visual data 1410. The visual reproduction of an instructions payload comprising navigation and/or landmark markers 1400 can include a landmark marker 1416 that marks a landmark 1414 superimposed on the visual data 1410.

As discussed, FIG. 14 illustrates an example visual reproduction of an instructions payload comprising navigation and landmark markers. Other embodiments can include one or more other criteria described with reference to FIG. 14. Embodiments that may omit or add to one or more features to the visual reproduction of an instructions payload comprising navigation and/or landmark markers of FIG. 14 are within the scope of this disclosure.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for facilitating communications between a first driver of a first off-road vehicle and a second driver of a second off-road vehicle following the first off-road vehicle, the system comprising:
   a wireless data interface configured to receive a maneuver instructions payload comprising:
      electronically encoded verbal instructions, wherein the verbal instructions comprise instructions spoken by the first driver of the first off-road vehicle at a primary maneuver location; and
      electronically encoded primary maneuver location coordinates corresponding to the primary maneuver location, wherein the primary maneuver location corresponds to a geospatial location at which the first driver of the first off-road vehicle begins the verbal instructions;
   a location data interface configured to receive a real-time vehicle location of the second off-road vehicle from a satellite-linked position receiver, the second off-road vehicle following the first off-road vehicle;
   a hardware processor connected to a memory system, wherein the memory system comprises instructions executable by the hardware processor, wherein the instructions, when executed by the hardware processor, cause the system to:
      determine that the real-time vehicle location of the second off-road vehicle is within a threshold distance of the primary maneuver location; and
      in response to determining that the real-time vehicle location of the second off-road vehicle is within the threshold distance of the primary maneuver location, reproduce the verbal instructions in a manner perceivable by the second driver of the second off-road vehicle.

2. The system of claim 1, wherein the maneuver instructions payload further comprises:
   electronically encoded secondary maneuver location coordinates corresponding to a secondary maneuver location, wherein the secondary maneuver location corresponds to a geospatial location at which the first driver of the first off-road vehicle continues giving the verbal instructions;
   wherein a message path comprises the primary maneuver location, the secondary maneuver location, and a path connecting the primary maneuver location to the secondary maneuver location.

3. The system of claim 2, wherein the instructions, when executed by the hardware processor, are configured to cause the system to:
   determine whether the real-time vehicle location of the second off-road vehicle is within a second threshold distance of the secondary maneuver location;
   in response to determining that the real-time vehicle location of the second off-road vehicle is within the second threshold distance of the secondary maneuver location, continue reproducing the verbal instructions;
   in response to determining that the real-time vehicle location of the second off-road vehicle is not within the second threshold distance of the secondary maneuver location, pause the reproduction of the verbal instructions and prompt the second driver of the second off-road vehicle to indicate if the reproduction of the verbal instructions should be continued; and
   in response to the second driver of the second off-road vehicle indicating that the reproduction of the verbal instructions should be continued, continue reproducing the verbal instructions.

4. The system of claim 2, wherein the instructions, when executed by the hardware processor, are configured to cause the system to:
   determine that the real-time vehicle location of the second off-road vehicle has deviated from the message path by at least a third threshold distance; and
   in response to determining that the real-time vehicle location of the second off-road vehicle has deviated from the message path by at least the third threshold distance, generate a path deviation alert perceivable by the second driver of the second off-road vehicle.

5. The system of claim 4, wherein the instructions, when executed by the hardware processor, are configured to cause the system to:
   in response to determining that the real-time vehicle location of the second off-road vehicle has deviated from the message path, pause the reproduction of the verbal instructions and prompt the second driver of the second off-road vehicle to indicate if the reproduction of the verbal instructions should be continued; and
   in response to the second driver of the second off-road vehicle indicating that the reproduction of the verbal instructions should be continued, continue reproducing the verbal instructions.

6. The system of claim 4, wherein the instructions, when executed by the hardware processor, are configured to cause the system to:
  in response to determining that the real-time vehicle location of the second off-road vehicle has deviated from the message path, prompt the second driver of the second off-road vehicle to indicate if the second driver should be routed back to the message path;
  in response to the second driver of the second off-road vehicle indicating that the second driver of the second off-road vehicle should be routed back to the message path, generate a display of the message path and the real-time location of the second off-road vehicle, and prompt the second driver of the second off-road vehicle to select a location along the message path; and
  in response to the second driver of the second off-road vehicle selecting a location along the message path, generate direction guidance routing the second driver of the second off-road vehicle to the selected location along the message path.

7. The system of claim 2, further comprising a camera interface configured to receive images captured by a camera positioned to capture imagery in the vicinity of the first vehicle.

8. The system of claim 7, wherein:
  the maneuver instructions payload comprises electronically encoded imagery captured by the camera at the primary maneuver location; and
  wherein the instructions, when executed by the hardware processor, are configured to cause the system to:
    in response to determining that the real-time vehicle location of the second off-road vehicle is within the threshold distance of the primary maneuver location, reproduce at least a portion of the imagery in a manner perceivable by the second driver of the second off-road vehicle.

9. The system of claim 8, wherein:
  the maneuver instructions payload comprises electronically encoded secondary imagery captured by the camera at the secondary maneuver location; and
  wherein the instructions, when executed by the hardware processor, are configured to cause the system to:
    in response to determining that the real-time vehicle location of the second off-road vehicle is within the threshold distance of the secondary maneuver location, reproduce at least a portion of the secondary imagery in a manner perceivable by the second driver of the second off-road vehicle.

10. The system of claim 8, wherein the instructions, when executed by the hardware processor, are configured to cause the system to:
  determine that the verbal instructions comprise a navigation keyword;
  in response to determining that the verbal instructions comprise the navigation keyword, receive a keyword geospatial location from the satellite-linked position receiver and generate a display of a navigation marker on a map at the keyword geospatial location.

11. The system of claim 8, wherein the instructions, when executed by the hardware processor, are configured to cause the system to:
  determine that the verbal instructions comprise a landmark keyword;
  in response to determining the verbal instructions comprise the landmark keyword, use an image recognition algorithm to identify a landmark in the imagery and generate a display of a landmark marker in the imagery.

12. The system of claim 7, wherein:
  the maneuver instructions payload comprises electronically encoded video captured by the camera at the primary maneuver location; and
  wherein the instructions, when executed by the hardware processor, are configured to cause the system to:
    in response to determining that the real-time vehicle location of the second off-road vehicle is within the threshold distance of the primary maneuver location, reproduce the video in a manner perceivable by the second driver of the second off-road vehicle.

13. The system of claim 12, wherein the instructions, when executed by the hardware processor, are configured to cause the system to:
  determine that the verbal instructions comprise a navigation keyword and/or a landmark keyword;
  in response to determining that the verbal instructions comprise the navigation keyword, generate a display of a navigation marker superimposed on the video; and
  in response to determining that the verbal instructions comprise the landmark keyword, use an image recognition algorithm to identify a landmark in the video and generate a display of a landmark marker in the video.

14. The system of claim 1, wherein the system is configured to begin recording the verbal instructions when the first driver of the first off-road vehicle speaks a trigger word.

15. The system of claim 14, wherein the instructions, when executed by the hardware processor, are configured to cause the system to:
  determine that the first driver of the first off-road vehicle has spoken a recipient keyword identifying a recipient of the verbal instructions;
  in response to determining that the first driver of the first off-road vehicle has spoken the recipient keyword, identify at least one corresponding intended recipient and reproduce the verbal instructions in a manner perceivable by the at least one corresponding intended recipient.

16. The system of claim 1, wherein the system is configured to begin recording the verbal instructions when the first driver of the first off-road vehicle speaks at or above a threshold volume.

17. The system of claim 1, wherein the system is configured to begin recording the verbal instructions when the first driver of the first off-road vehicle presses a button.

18. The system of claim 1, wherein the maneuver instructions payload comprises sensor information collected by a sensing system connected to the first off-road vehicle.

19. Headgear configured to be worn by a driver of a vehicle and to facilitate communications between a driver of an off-road vehicle and another driver of a different off-road vehicle, the headgear comprising:
  the system of claim 1;
  a speaker configured to reproduce verbal instructions in a manner perceivable by the driver of the off-road vehicle;
  a microphone positioned to receive verbal communications from the driver of the off-road vehicle;
  a data interface configured to connect to the hardware processor, and
  a power connection configured to connect to a power supply.

20. A system for facilitating communications between a first driver of a first vehicle and a second driver of a second vehicle following the first vehicle, the system comprising:
  a wireless data interface configured to receive a maneuver instructions payload comprising:

electronically encoded maneuver instructions, wherein the maneuver instructions comprise instructions from the first driver of the first vehicle at a primary maneuver location; and electronically encoded primary maneuver location coordinates corresponding to the primary maneuver location, wherein the maneuver location corresponds to a geospatial location at which the first driver of the first vehicle begins providing the maneuver instructions;

a location data interface configured to receive a real-time vehicle location of the second vehicle from a satellite-linked position receiver, the second vehicle following the first vehicle;

a hardware processor connected to a memory system, wherein the memory system comprises instructions executable by the hardware processor, wherein the instructions, when executed by the hardware processor, cause the system to:

determine that the real-time vehicle location of the second vehicle is within a threshold distance of the primary maneuver location; and in response to determining that the real-time vehicle location is within the threshold distance of the primary maneuver location, reproduce the maneuver instructions in a manner perceivable by the second driver of the second vehicle.

\* \* \* \* \*